US012100410B2

(12) United States Patent
Kamamoto et al.

(10) Patent No.: US 12,100,410 B2
(45) **Date of Patent: *Sep. 24, 2024**

(54) PITCH EMPHASIS APPARATUS, METHOD, PROGRAM, AND RECORDING MEDIUM FOR THE SAME

(71) Applicant: NIPPON TELEGRAPH AND TELEPHONE CORPORATION, Tokyo (JP)

(72) Inventors: Yutaka Kamamoto, Kanagawa (JP); Ryosuke Sugiura, Kanagawa (JP); Takehiro Moriya, Kanagawa (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 213 days.

This patent is subject to a terminal disclaimer.

(21) Appl. No.: 17/053,681

(22) PCT Filed: Mar. 22, 2019

(86) PCT No.: PCT/JP2019/011984

§ 371 (c)(1),
(2) Date: Nov. 6, 2020

(87) PCT Pub. No.: WO2019/216037

PCT Pub. Date: Nov. 14, 2019

(65) Prior Publication Data

US 2021/0233549 A1 Jul. 29, 2021

(30) Foreign Application Priority Data

May 10, 2018 (JP) ................................ 2018-091199

(51) Int. Cl.
*G10L 21/013* (2013.01)
*G10L 21/034* (2013.01)
*G10L 21/0364* (2013.01)

(52) U.S. Cl.
CPC .......... *G10L 21/013* (2013.01); *G10L 21/034* (2013.01); *G10L 21/0364* (2013.01)

(58) Field of Classification Search
CPC .. G10L 21/013; G10L 21/034; G10L 21/0364
See application file for complete search history.

(56) References Cited

U.S. PATENT DOCUMENTS 5,572,623 A * 11/1996 Pastor ..................... G10L 25/87
704/E11.005
5,864,798 A 1/1999 Miseki et al.
(Continued)

FOREIGN PATENT DOCUMENTS

JP H10-143195 A 5/1998
WO 2019/216187 A1 11/2019

OTHER PUBLICATIONS

International Telecommunication Union (2006) "Dual rate speech coder for multimedia communications transmitting at 5.3 and 6.3 kbit/s," ITU-T Recommendation G.723.1 (May 2006) pp. 16-18.

*Primary Examiner* — Bryan S Blankenagel

(57) ABSTRACT

As pitch enhancement processing, a pitch enhancement apparatus obtains, for a time segment judged to be a time segment including a signal that is a consonant, for each time of the time segment, as an output signal, a signal including a signal obtained by adding a signal, which was obtained by multiplying a signal at a time that is an earlier time than the time by the number of samples $T_0$ corresponding to a pitch period of the time segment, the pitch gain $\sigma_0$ of the time segment, a predetermined constant $B_0$, and a value that is greater than 0 and less than 1, and a signal at the time.

11 Claims, 4 Drawing Sheets

(56) References Cited

U.S. PATENT DOCUMENTS

| | | | |
|---|---|---|---|
| 6,064,962 | A | 5/2000 | Oshikiri et al. |
| 7,286,980 | B2 * | 10/2007 | Wang ...................... G10L 19/26 704/E19.045 |
| 2012/0095767 | A1 * | 4/2012 | Hirose .................. G10L 13/033 704/258 |
| 2014/0177853 | A1 * | 6/2014 | Toyama .............. G10L 21/0208 381/58 |
| 2017/0140745 | A1 * | 5/2017 | Nayak ................. H04L 65/1089 |
| 2017/0140769 | A1 | 5/2017 | Ravelli et al. |
| 2021/0090587 | A1 | 3/2021 | Kamamoto et al. |

* cited by examiner

PITCH EMPHASIS APPARATUS, METHOD, PROGRAM, AND RECORDING MEDIUM FOR THE SAME

CROSS-REFERENCE TO RELATED APPLICATIONS

This application is a U.S. 371 Application of International Patent Application No. PCT/JP2019/011984, filed on 22 Mar. 2019, which application claims priority to and the benefit of JP Application No. 2018-091199, filed on 10 May 2018, the disclosures of which are hereby incorporated herein by reference in their entireties.

TECHNICAL FIELD

This invention relates to a technology to analyze and enhance a pitch component of a sample sequence derived from an audio signal in signal processing technology such as audio signal coding technology.

BACKGROUND ART

In general, when a sample sequence of a time series signal or the like is subjected to lossy compression coding, a sample sequence which is obtained at the time of decoding is a distorted sample sequence different from the original sample sequence. In coding of an audio signal, in particular, this distortion often contains a pattern that natural sounds do not have, which sometimes makes a decoded audio signal sound unnatural to a person who hears it. To address this problem, with attention being paid to a fact that many natural sounds, when observed in a certain segment, each contain a periodic component, that is, a pitch corresponding to each sound, processing to enhance a pitch component (pitch enhancement processing) by adding an earlier sample than each sample by a pitch period is performed on each sample of an audio signal obtained by decoding. A technology that converts a sound into a sound closer to a natural sound by this pitch enhancement processing is widely used (for example, Non-patent Literature 1).

Moreover, as described in Patent Literature 1, for example, there is another technology that, based on information indicating whether an audio signal obtained by decoding is "speech" or "non-speech", performs processing to enhance a pitch component if the audio signal is "speech" and does not perform processing to enhance a pitch component if the audio signal is "non-speech".

PRIOR ART LITERATURE

Non-Patent Literature

Non-patent Literature 1: ITU-T Recommendation G.723.1 (05/2006) pp. 16-18, 2006

PATENT LITERATURE

Patent Literature 1: Japanese Patent Application Laid Open No. H10-143195

SUMMARY OF THE INVENTION

Problems to be Solved by the Invention

However, the problem of the technology described in Non-patent Literature 1 is that processing to enhance a pitch component is performed also on a consonant portion without a clear pitch structure, which makes the consonant portion sound unnatural to a person who hears it. On the other hand, one problem of the technology described in Patent Literature 1 is that, even when a pitch component is present in a consonant portion as a signal, no processing to enhance a pitch component is performed, which makes the consonant portion sound unnatural to a person who hears it. Moreover, another problem of the technology described in Patent Literature 1 is that the presence or absence of pitch enhancement processing changes between a vowel time segment and a consonant time segment, which frequently causes discontinuity in an audio signal and makes the audio signal sound more unnatural to a person who hears it.

The present invention has been made to solve these problems and an object thereof is to achieve pitch enhancement processing that makes a consonant sound less unnatural even in a consonant time segment and, even with frequent switching between a consonant time segment and other time segments, makes a consonant, which may sound unnatural due to discontinuity, sound less unnatural to a person who hears it. It is to be noted that consonants include fricatives, plosives, semivowels, nasals, and affricates (see Reference Literatures 1 and 2).

(Reference Literature 1) Sadaoki Furui, "Sound/Speech Engineering", Kindai kagaku sha Co., Ltd., 1992, p. 99

(Reference Literature 2) Shuzo Saito, Kazuo Nakata, "Basics of Speech Information Processing", Ohmsha, Ltd., 1981, pp. 38-39

Means to Solve the Problems

In order to solve the above-described problems, according to one aspect of the present invention, a pitch enhancement apparatus obtains an output signal by performing, for each time segment, pitch enhancement processing on a signal derived from an input audio signal. The pitch enhancement apparatus includes a pitch enhancement unit that performs, as the pitch enhancement processing, for a time segment judged to be a time segment including the signal that is a consonant, for each time of the time segment, processing to obtain, as an output signal, a signal including a signal obtained by adding a signal, which was obtained by multiplying the signal at a time that is an earlier time than the time by the number of samples $T_0$ corresponding to a pitch period of the time segment, the pitch gain $\sigma_0$ of the time segment, a predetermined constant $B_0$, and a value that is greater than 0 and less than 1, and the signal at the time, and, for a time segment judged to be a time segment including the signal that is not a consonant, for each time of the time segment, processing to obtain, as an output signal, a signal including a signal obtained by adding a signal, which was obtained by multiplying the signal at a time that is an earlier time than the time by the number of samples $T_0$ corresponding to a pitch period of the time segment, the pitch gain $\sigma_0$ of the time segment, and a predetermined constant $B_0$, and the signal at the time.

In order to solve the above-described problems, according to another aspect of the present invention, a pitch enhancement apparatus obtains an output signal by performing, for each time segment, pitch enhancement processing on a signal derived from an input audio signal. The pitch enhancement apparatus includes a pitch enhancement unit that performs, as the pitch enhancement processing, for each time n of each time segment, processing to obtain, as an output signal, a signal including a signal obtained by adding a signal, which was obtained by multiplying the signal at a time that is an earlier time than the time n by the number of samples $T_0$ corresponding to a pitch period of the time segment, the pitch gain $\sigma_0$ of the time segment, and a value that becomes smaller as the consonant-likeness of the time segment becomes higher, and the signal at the time n.

In order to solve the above-described problems, according to still another aspect of the present invention, a pitch enhancement apparatus obtains an output signal by performing, for each time segment, pitch enhancement processing on a signal derived from an input audio signal. The pitch enhancement apparatus includes a pitch enhancement unit that performs, as the pitch enhancement processing, for a time segment judged to be a time segment including the signal that is a consonant or/and the signal whose spectral envelope is flat, for each time of the time segment, processing to obtain, as an output signal, a signal including a signal obtained by adding a signal, which was obtained by multiplying the signal at a time that is an earlier time than the time by the number of samples $T_0$ corresponding to a pitch period of the time segment, the pitch gain $\sigma_0$ of the time segment, a predetermined constant $B_0$, and a value that is greater than 0 and less than 1, and the signal at the time, and, for a time segment about which a judgment other than that described above has been made, for each time of the time segment, processing to obtain, as an output signal, a signal including a signal obtained by adding a signal, which was obtained by multiplying the signal at a time that is an earlier time than the time by the number of samples $T_0$ corresponding to a pitch period of the time segment, the pitch gain $\sigma_0$ of the time segment, and a predetermined constant $B_0$, and the signal at the time.

In order to solve the above-described problems, according to yet another aspect of the present invention, a pitch enhancement apparatus obtains an output signal by performing, for each time segment, pitch enhancement processing on a signal derived from an input audio signal. The pitch enhancement apparatus includes a pitch enhancement unit that performs, as the pitch enhancement processing, for each time n of each time segment, processing to obtain, as an output signal, a signal including a signal obtained by adding a signal, which was obtained by multiplying the signal at a time that is an earlier time than the time n by the number of samples $T_0$ corresponding to a pitch period of the time segment, the pitch gain $\sigma_0$ of the time segment, and a value that becomes smaller as the consonant-likeness of the time segment becomes higher and that becomes smaller as the flatness of the spectral envelope of the time segment becomes higher, and the signal at the time n.

Effects of the Invention

According to the present invention, when pitch enhancement processing is performed on a speech signal obtained by decoding processing, it is possible to achieve pitch enhancement processing that makes a consonant sound less unnatural even in a consonant time segment and, even with frequent switching between a consonant time segment and other time segments, makes a consonant, which may sound unnatural due to discontinuity, sound less unnatural to a person who hears it.

DETAILED DESCRIPTION OF THE EMBODIMENTS

Figure 1:
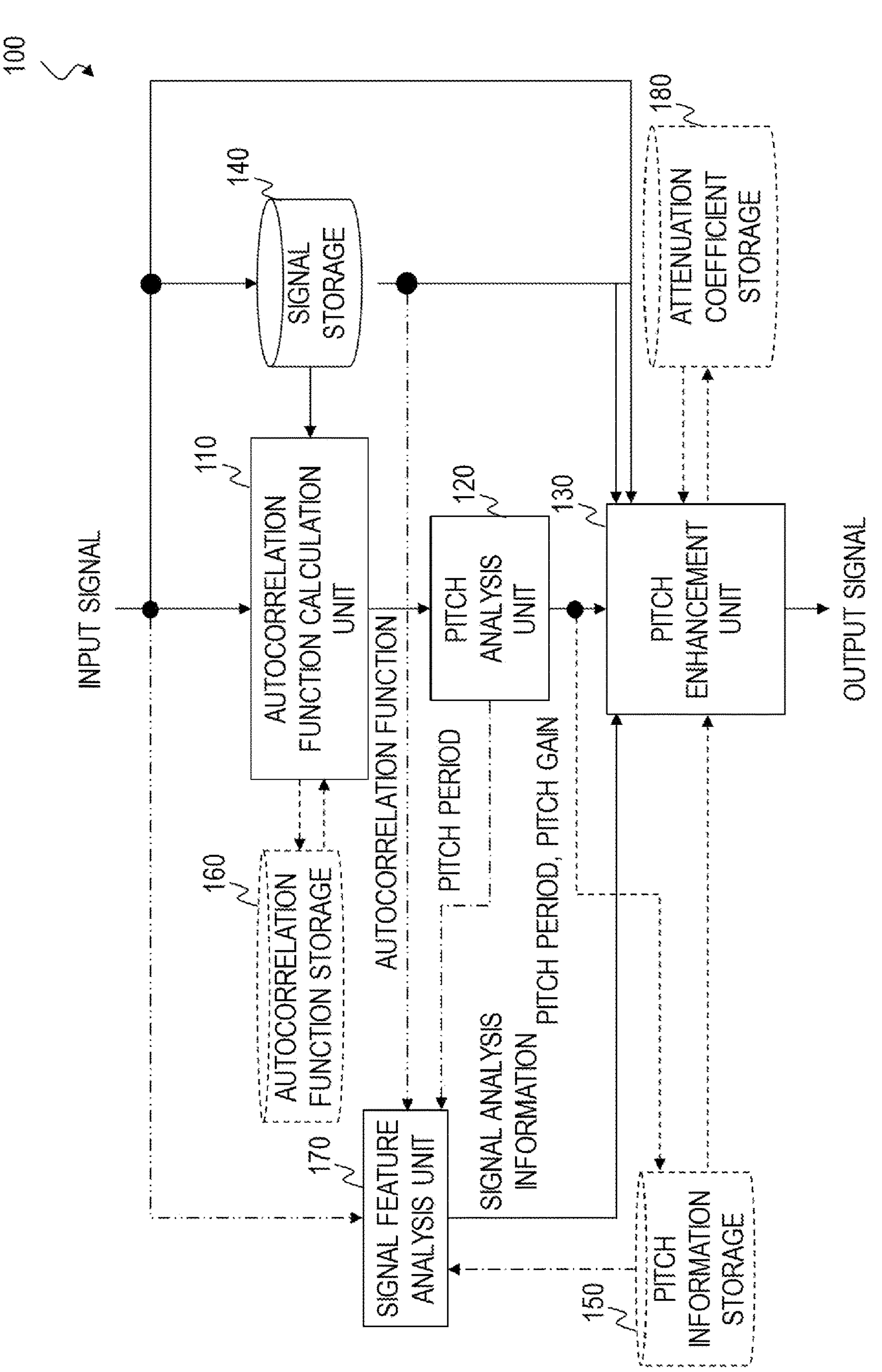
FIG. 1 is a functional block diagram of a pitch enhancement apparatus according to a first embodiment, a second embodiment, a third embodiment, and modifications thereof.

Hereinafter, embodiments of the present invention will be described. It is to be noted that, in the drawings which are used in the following description, component units having the same function and steps in which the same processing is performed are identified with the same reference characters and overlapping explanations are omitted. In the following description, it is assumed that processing which is performed element by element of a vector and a matrix is applied to all the elements of the vector and the matrix unless otherwise specified.

First Embodiment

Figure 2:
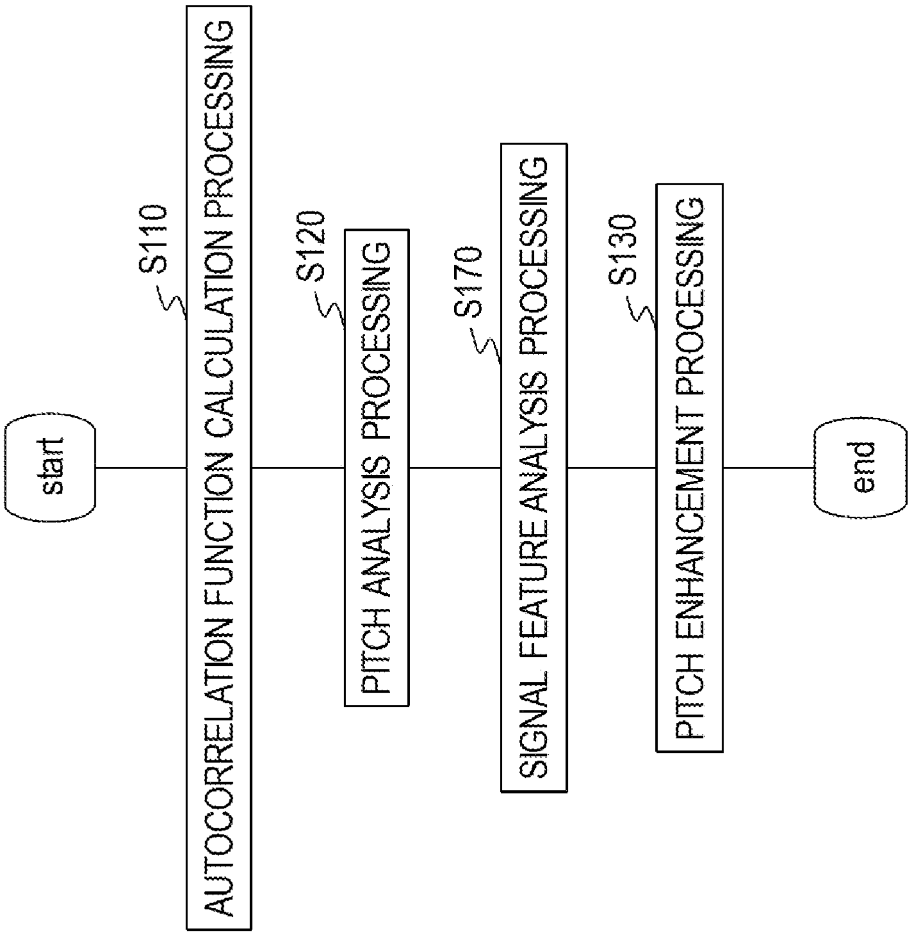
FIG. 2 is a diagram showing an example of a processing flow of the pitch enhancement apparatus according to the first embodiment, the second embodiment, the third embodiment, and the modifications thereof.

FIG. 1 shows a functional block diagram of a speech pitch enhancement apparatus 100 according to a first embodiment and FIG. 2 shows a processing flow of the speech pitch enhancement apparatus 100.

A processing procedure of the speech pitch enhancement apparatus 100 of the first embodiment will be described with reference to FIG. 1. The speech pitch enhancement apparatus 100 of the first embodiment obtains a pitch period and pitch gain by analyzing an input signal and enhances a pitch based on the pitch period and the pitch gain. In the present embodiment, when pitch enhancement processing is performed on an input audio signal of each time segment by using a pitch component, which corresponds to a pitch period, multiplied by pitch gain, the degree of enhancement of a pitch component of a consonant time segment is made lower than the degree of enhancement of a pitch component of a non-consonant time segment or the degree of enhancement of a pitch component of a time segment is made lower as the consonant-likeness of the time segment becomes higher. More specifically, for a consonant time segment, pitch gain multiplied by a value less than 1 is used in place of pitch gain. The speech pitch enhancement apparatus 100 of the first embodiment includes a signal feature analysis unit 170, an autocorrelation function calculation unit 110, a pitch analysis unit 120, a pitch enhancement unit 130, and a signal storage 140. In addition, the speech pitch enhancement apparatus 100 of the first embodiment may include a pitch information storage 150, an autocorrelation function storage 160, and an attenuation coefficient storage 180.

The speech pitch enhancement apparatus 100 is a special apparatus configured as a result of a special program being read into a publicly known or dedicated computer including, for example, a central processing unit (CPU), a main storage unit (random access memory: RAM), and so forth. The speech pitch enhancement apparatus 100 executes each processing under the control of the central processing unit, for example. The data input to the speech pitch enhancement apparatus 100 and the data obtained by each processing are stored in the main storage unit, for instance, and the data stored in the main storage unit is read into the central processing unit when necessary and used for other processing. At least part of each processing unit of the speech pitch enhancement apparatus 100 may be configured with hardware such as an integrated circuit. Each storage of the speech pitch enhancement apparatus 100 can be configured with, for example, a main storage unit such as random access memory (RAM) or middleware such as a relational database or a key-value store. It is to be noted that the speech pitch enhancement apparatus 100 does not necessarily have to include each storage; each storage may be configured with an auxiliary storage unit configured with a hard disk, an optical disk, or a semiconductor memory element such as flash memory and provided outside the speech pitch enhancement apparatus 100.

Main processing which is performed by the speech pitch enhancement apparatus 100 of the first embodiment includes autocorrelation function calculation processing (S110), pitch analysis processing (S120), signal feature analysis processing (S170), and pitch enhancement processing (S130) (see FIG. 2). Since these processing is performed by a plurality of hardware resources of the speech pitch enhancement apparatus 100 in cooperation with each other, each of the autocorrelation function calculation processing (S110), the pitch analysis processing (S120), the signal feature analysis processing (S170), and the pitch enhancement processing (S130) will be explained in the following description along with related processing.

[Autocorrelation Function Calculation Processing (S110)]

First, the autocorrelation function calculation processing, which is performed by the speech pitch enhancement apparatus 100, and related processing will be described.

A time domain audio signal (input signal) is input to the autocorrelation function calculation unit 110. This audio signal is a signal obtained by performing compression coding of a sound signal such as a speech signal by a coding apparatus and decoding the codes by a decoding apparatus corresponding to the coding apparatus. A sample sequence of a time domain audio signal of the current frame, which was input to the speech pitch enhancement apparatus 100, is input to the autocorrelation function calculation unit 110 in frames (time segments), each having a predetermined length of time. Assume that a positive integer representing the length of a sample sequence of one frame is N; then, N time domain audio signal samples that make up a sample sequence of a time domain audio signal of the current frame are input to the autocorrelation function calculation unit 110. The autocorrelation function calculation unit 110 calculates an autocorrelation function $R_0$ at time lag 0 and autocorrelation functions $R_{\tau(1)}, \ldots, R_{\tau(M)}$ for each of a plurality of (M; M is a positive integer) predetermined time lags $\tau(1), \ldots, \tau(M)$ in a sample sequence of the latest L (L is a positive integer) audio signal samples including the input N time domain audio signal samples. That is, the autocorrelation function calculation unit 110 calculates autocorrelation functions in a sample sequence of the latest audio signal samples including the time domain audio signal samples of the current frame.

In the following description, the autocorrelation functions calculated by the autocorrelation function calculation unit 110 in processing of the current frame, that is, the autocorrelation functions in a sample sequence of the latest audio signal samples including the time domain audio signal samples of the current frame will also be referred to as the "autocorrelation functions of the current frame"; likewise, if a certain earlier frame is assumed to be a frame F, the autocorrelation functions calculated by the autocorrelation function calculation unit 110 in processing of the frame F, that is, the autocorrelation functions in a sample sequence of the latest audio signal samples at the frame F, which include the time domain audio signal samples of the frame F, will also be referred to as the "autocorrelation functions of the frame F". Moreover, the "autocorrelation function" will also be referred to simply as the "autocorrelation". When L is a value greater than N, the speech pitch enhancement apparatus 100 includes the signal storage 140 to use the latest L audio signal samples for calculation of autocorrelation functions and the signal storage 140 is configured so that the signal storage 140 can store at least L−N audio signal samples, which are the latest audio signal samples, input by the previous frame. Then, when the N time domain audio signal samples of the current frame are input, the autocorrelation function calculation unit 110 reads the latest L−N audio signal samples, which are stored in the signal storage 140, as $X_0, X_1, \ldots, X_{L-N-1}$ and obtains the latest L audio signal samples $X_0, X_1, \ldots, X_{L-1}$ by assigning the input N time domain audio signal samples to $X_{L-N}, X_{L-N+1}, \ldots, X_{L-1}$.

Then, the autocorrelation function calculation unit 110 calculates an autocorrelation function $R_0$ at time lag 0 and autocorrelation functions $R_{\tau(1)}, \ldots, R_{\tau(M)}$ for each of a plurality of predetermined time lags $\tau(1), \ldots, \tau(M)$ by using the latest L audio signal samples $X_0, X_1, \ldots, X_{L-1}$. If a time lag such as $\tau(1), \ldots, \tau(M)$ and 0 is assumed to be $\tau$, the autocorrelation function calculation unit 110 calculates an autocorrelation function $R_\tau$ by Formula (1) below, for example.

$$R_\tau = \sum_{l=\tau}^{L-1} X_l X_{l-\tau} \tag{1}$$

The autocorrelation function calculation unit 110 outputs the calculated autocorrelation functions $R_0$ and $R_{\tau(1)}, \ldots, R_{\tau(M)}$ to the pitch analysis unit 120.

Here, these time lags $\tau(1), \ldots, \tau(M)$ are candidates for a pitch period $T_0$ of the current frame, which is obtained by the pitch analysis unit 120 which will be described later. For example, for an audio signal whose principal component is a speech signal sampled at a sampling frequency of 32 kHz, M values out of integer values from 75 to 320 which are suitable for candidates for a speech pitch period can be adopted as $\tau(1), \ldots, \tau(M)$, for instance. In place of $R_\tau$ in Formula (1), a normalized autocorrelation function $R_\tau/R_0$, which is obtained by dividing $R_\tau$ in Formula (1) by $R_0$, may be obtained. It is to be noted that, when, for example, L is set at a sufficiently large value such as 8192 for integer values from 75 to 320 which are candidates for a pitch period $T_0$, it is better to calculate the autocorrelation function $R_\tau$ by a method that curbs the amount of computation, which will be described below, rather than to obtain a normalized autocorrelation function $R_\tau/R_0$ in place of the autocorrelation function $R_\tau$.

The autocorrelation function $R_\tau$ may be calculated by Formula (1) itself; alternatively, a value that is the same as a value which is obtained by Formula (1) may be calculated by another calculation method. For example, the speech pitch enhancement apparatus 100 includes the autocorrelation function storage 160 and stores, in the autocorrelation function storage 160, the autocorrelation functions (the autocorrelation functions of the immediately preceding frame) $R_{\tau(1)}, \ldots, R_{\tau(M)}$ obtained by processing to calculate autocorrelation functions of the previous frame (the immediately preceding frame). The autocorrelation function calculation unit 110 may calculate the autocorrelation functions $R_{\tau(1)}, \ldots, R_{\tau(M)}$ of the current frame by adding the contributions of the newly input audio signal samples of the current frame to and subtracting the contributions of the earliest frame from each of the autocorrelation functions (the autocorrelation functions of the immediately preceding frame) $R_{\tau(1)}, \ldots, R_{\tau(M)}$ read from the autocorrelation function storage 160, which were obtained by the processing of the immediately preceding frame. This makes it possible to curb the amount of computation needed to calculate autocorrelation functions compared to calculation performed by using Formula (1) itself. In this case, if each of $\tau(1), \ldots, \tau(M)$ is assumed to be $\tau$, the autocorrelation function calculation unit 110 obtains the autocorrelation function $R_\tau$ of the current frame by adding a difference $\Delta R_\tau^*$, which is obtained by Formula (2) below, to and subtracting a difference $\Delta R_\tau^-$, which is obtained by Formula (3) in the immediately preceding frame, from the autocorrelation function $R_\tau$ (the autocorrelation function $R_\tau$ of the immediately preceding frame) obtained by the processing of the immediately preceding frame.

$$\Delta R_\tau^+ = \sum_{l=L-N}^{L-1} X_l X_{l-\tau} \tag{2}$$

$$\Delta R_\tau^- = \sum_{l=\tau}^{N-1+\tau} X_l X_{l-\tau} \tag{3}$$

Moreover, the amount of computation may be reduced by calculating an autocorrelation function by processing similar to that described above using, not the latest L audio signal samples themselves of an input audio signal, a signal whose number of samples is reduced by, for example, performing downsampling on the L audio signal samples or decimating samples. In this case, when, for example, the number of samples is reduced by half, M time lags $\tau(1), \ldots, \tau(M)$ are expressed by using half the number of samples. For instance, when the above-described 8192 audio signal samples obtained by sampling at a sampling frequency of 32 kHz are downsampled to 4096 samples obtained by sampling at a sampling frequency of 16 kHz, it is only necessary to change $\tau(1), \ldots, \tau(M)$, which are candidates for a pitch period $T_0$, from M values out of the integer values from 75 to 320 to M values out of integer values from 37 to 160, which are about half of the integer values from 75 to 320.

It is to be noted that the audio signal samples stored in the signal storage 140 are used also for the signal feature analysis processing, which will be described later. Specifically, in the signal feature analysis processing, which will be described later, J-N (J is a positive integer) audio signal samples stored in the signal storage 140 are used. That is, if the larger one of the two values, L and J, is assumed to be K (if K=max(L, J)), it is necessary to store, in the signal storage 140, at least K−N audio signal samples, which are the latest audio signal samples, input by the previous frame. Therefore, after the speech pitch enhancement apparatus 100 completes processing which is performed on the current frame by the pitch enhancement unit 130, which will be described later, the signal storage 140 updates the storage contents so as to store the latest K−N audio signal samples at this point. Specifically, for example, when K>2N, the signal storage 140 deletes the oldest N audio signal samples $XR_0, XR_1, \ldots, XR_{N-1}$ of the stored K−N audio signal samples, assigns $XR_N, XR_{N+1}, \ldots, XR_{K-N-1}$ to $XR_0, XR_1, \ldots, XR_{K-2N-1}$, and newly stores the input N time domain audio signal samples of the current frame as $XR_{K-2N}, XR_{K-2N+1}, \ldots, XR_{K-N-1}$. Moreover, when K≤N, the signal storage 140 deletes the stored K−N audio signal samples $XR_0, XR_1, \ldots, XR_{K-N-1}$ and newly stores the latest K−N audio signal samples of the input N time domain audio signal samples of the current frame as $XR_0, XR_1, \ldots, XR_{K-N-1}$. When K≤N, the speech pitch enhancement apparatus 100 does not have to include the signal storage 140.

Furthermore, after the autocorrelation function calculation unit 110 completes calculation of an autocorrelation function of the current frame, the autocorrelation function storage 160 updates the storage contents so as to store the calculated autocorrelation functions $R_{\tau(1)}, \ldots, R_{\tau(M)}$ of the current frame. Specifically, the autocorrelation function storage 160 deletes the stored $R_{\tau(1)}, \ldots, R_{\tau(M)}$ and newly stores the calculated autocorrelation functions $R_{\tau(1)}, \ldots, R_{\tau(M)}$ of the current frame.

The above description is based on the assumption that the latest L audio signal samples include the N audio signal samples of the current frame (that is, L≥N); however, L does not necessarily have to be greater than or equal to N and L may be less than N. In this case, the autocorrelation function calculation unit 110 only has to calculate an autocorrelation function $R_0$ at time lag 0 and autocorrelation functions $R_{\tau(1)}, \ldots, R_{\tau(M)}$ for each of a plurality of predetermined time lags $\tau(1), \ldots, \tau(M)$ by using L consecutive audio signal samples $X_0, X_1, \ldots, X_{L-1}$ included in the N audio signal samples of the current frame.

[Pitch Analysis Processing (S120)]

Next, the pitch analysis processing which is performed by the speech pitch enhancement apparatus 100 will be described.

The autocorrelation functions $R_0$ and $R_{\tau(1)}, \ldots, R_{\tau(M)}$ of the current frame, which were output from the autocorrelation function calculation unit 110, are input to the pitch analysis unit 120.

The pitch analysis unit 120 obtains the maximum value among the autocorrelation functions $R_{\tau(1)}, \ldots, R_{\tau(M)}$ of the current frame for predetermined time lags. The pitch analysis unit 120 obtains the ratio between the maximum value of the autocorrelation function and the autocorrelation function $R_0$ at time lag 0 as the pitch gain $\sigma_0$ of the current frame, obtains a time lag at which the value of the autocorrelation function becomes the maximum value as a pitch period $T_0$ of the current frame, and outputs the pitch gain $\sigma_0$ and the pitch period $T_0$ to the pitch enhancement unit 130.

[Signal Feature Analysis Processing (S170)]

Next, the signal feature analysis processing which is performed by the speech pitch enhancement apparatus 100 will be described.

Information derived from a time domain audio signal is input to the signal feature analysis unit 170. This audio signal is the same signal as the audio signal which is input to the autocorrelation function calculation unit 110.

For example, a sample sequence of a time domain audio signal of the current frame, which was input to the speech pitch enhancement apparatus 100, is input to the signal feature analysis unit 170 in frames (time segments), each having a predetermined length of time. That is, N time domain audio signal samples that make up a sample sequence of a time domain audio signal of the current frame are input to the signal feature analysis unit 170. In this case, the signal feature analysis unit 170 obtains, using a sample sequence of the latest J (J is a positive integer) audio signal samples including the input N time domain audio signal samples, information indicating whether or not the current frame is a consonant or the consonant-likeness index value of the current frame, and outputs the information or the consonant-likeness index value to the pitch enhancement unit 130 as signal analysis information $I_0$. That is, in this case, "information derived from a time domain audio signal" is a sample sequence of a time domain audio signal of the current frame (indicated by chain double-dashed lines in FIG. 1).

Moreover, for example, pitch periods from the pitch period $T_0$ of the current frame to a pitch period $T_{-\varepsilon}$ of the ε-th frame previous to the current frame are input to the signal feature analysis unit 170 in frames (time segments), each having a predetermined length of time. In this case, the signal feature analysis unit 170 obtains, using the pitch periods from the pitch period $T_0$ of the current frame to the pitch period $T_{-\varepsilon}$ of the c-th frame previous to the current frame, information indicating whether or not the current frame is a consonant or the consonant-likeness index value of the current frame, and outputs the information or the consonant-likeness index value to the pitch enhancement unit 130 as the signal analysis information $I_0$. That is, in this case, "information derived from a time domain audio signal" is pitch periods from the pitch period $T_0$ of the current frame to the pitch period $T_{-\varepsilon}$ of the ε-th frame previous to the current frame (indicated by alternate long and short dashed lines in FIG. 1). In this case, the speech pitch enhancement apparatus 100 further includes the pitch information storage 150 and stores, in the pitch information storage 150, the pitch periods $T_{-1}, \ldots, T_{-\varepsilon}$ of frames from the previous frame to the ε-th frame previous to the current frame. Then, the signal feature analysis unit 170 uses the pitch period $T_0$ of the current frame, which was input from the pitch analysis unit 120, and the pitch periods $T_{-1}, \ldots, T_{-\varepsilon}$ of frames from the previous frame to the ε-th frame previous to the current frame, which were read from the pitch information storage 150. Here, a pitch period of the s-th frame previous to the current frame is written as $T_{-\varepsilon}$ and ε is a predetermined positive integer. The pitch information storage 150 updates the storage contents so that the pitch period of the current frame can be used as a pitch period of an earlier frame in processing which is performed on a subsequent frame by the signal feature analysis unit 170.

The signal feature analysis unit 170 obtains the signal analysis information $I_0$ by the signal feature analysis processing of Examples 1 to 5 below, for example.

(Example 1 of the Signal Feature Analysis Processing: An Example (1) in which the Consonant-Likeness Index Value is Used as the Signal Analysis Information)

In this example, the signal feature analysis unit 170 obtains, using the input pitch periods from the pitch period $T_0$ of the current frame to the pitch period $T_{-\varepsilon}$ of the ε-th frame previous to the current frame, an index value that becomes larger as the magnitude of discontinuity between pitch periods increases (also referred to as a "first consonant-likeness index value 1-1" for convenience in writing) as the consonant-likeness index value of the current frame, and outputs the obtained first index value 1-1 as the signal analysis information $I_0$.

The signal feature analysis unit 170 determines a first index value 1-1 δ by Formula (4) using, for example, the pitch period $T_0$ input from the pitch analysis unit 120 and the pitch periods $T_{-1}, \ldots, T_{-\varepsilon}$ of frames from the previous frame to the 6-th frame previous to the current frame, which were read from the pitch information storage 150.

$$\delta=(|T_0-T_{-1}|+|T_{-1}-T_{-2}|+ \ldots +|T_{-(\varepsilon-1)}-T_{-\varepsilon}|/\varepsilon \quad (4)$$

If a sound is a vowel, there is continuity between pitch periods, a difference between consecutive pitch periods is a value close to 0, and the value of δ also tends to be small; on the other hand, if a sound is a consonant, there is no continuity between pitch periods and the value of δ tends to be large. Thus, in this example, based on this tendency, the first index value 1-1 δ is used as the consonant-likeness index value. It is desirable to set c at a value that is large enough to make it possible to obtain adequate information for making a judgment and is small enough to prevent time segments corresponding to $T_0$ to $T_{-\varepsilon}$ from containing both a consonant and a vowel.

(Example 2 of the Signal Feature Analysis Processing: An Example (2) in which the Consonant-Likeness Index Value is Used as the Signal Analysis Information)

In this example, the signal feature analysis unit 170 obtains, using a sample sequence of the latest J audio signal samples including the input N time domain audio signal samples, a fricative-ness index value (also referred to as a "first consonant-likeness index value 1-2" for convenience in writing) as the consonant-likeness index value of the current frame, and outputs the obtained first index value 1-2 as the signal analysis information $I_0$.

The signal feature analysis unit 170 determines, for example, the number of zero-crossings (see Reference Literature 3) in a sample sequence of the latest J audio signal samples including the input N time domain audio signal samples as the first consonant-likeness index value 1-2 which is the fricative-ness index value. (Reference Literature 3) L. R. Rabiner et al., "Digital Processing of Speech Signals (Vol. 1)" translated by Hisayoshi Suzuki, Corona Publishing Co., Ltd., 1983, pp. 132-137

Moreover, the signal feature analysis unit 170 transforms, for example, a sample sequence of the latest J audio signal samples including the input N time domain audio signal samples into a frequency spectral sequence by the modified discrete cosine transform (MDCT) or the like. Next, the signal feature analysis unit 170 determines, as the first consonant-likeness index value 1-2 which is the fricative-ness index value, an index value that becomes larger as the ratio of the average energy of the samples on the high frequency side of the frequency spectral sequence to the average energy of the samples on the low frequency side of the frequency spectral sequence increases.

As described earlier, consonants include fricatives (see Reference Literatures 1 and 2). Therefore, in this example, the fricative-ness index value is used as the consonant-likeness index value.

Example 3 of the Signal Feature Analysis Processing: An Example in which an Index Value Obtained by Combining a Plurality of Index Values is Used as the Signal Analysis Information In this example, first, the signal feature analysis unit 170 obtains the first consonant-likeness index value 1-1 of the current frame by the same method as that of Example 1 using the input pitch periods from the pitch period $T_0$ of the current frame to the pitch period $T_{-\varepsilon}$ of the ε-th frame previous to the current frame (Step 3-1). Moreover, the signal feature analysis unit 170 obtains the first consonant-likeness index value 1-2 of the current frame by the same method as that of Example 2 using a sample sequence of the latest J audio signal samples including the input N time domain audio signal samples (Step 3-2). Furthermore, the signal feature analysis unit 170 obtains, as the consonant-likeness index value (also referred to as the "first consonant-likeness index value 1-3" for convenience in writing) of the current frame, a value that becomes larger as the first index value 1-1 becomes larger and that becomes larger as the first index value 1-2 becomes larger by, for example, the weighted addition of the first index value 1-1 obtained in Step 3-1 and the first index value 1-2 obtained in Step 3-2, and outputs the obtained first index value 1-3 as the signal analysis information $I_0$ (Step 3-3).

As described earlier, both the first index value 1-1 and the first index value 1-2 are indices indicating consonant-likeness. In this example, by combining two index values, it is possible to set the consonant-likeness index value more flexibly.

In Examples 1 to 3 of the signal feature analysis processing, the examples in which the consonant-likeness index value is used as the signal analysis information have been described. The following description deals with an example in which information indicating whether or not the current frame is a consonant is used as the signal analysis information.

(Example 4 of the Signal Feature Analysis Processing: An Example (1) in which Information Indicating Whether or not the Current Frame is a Consonant is Used as the Signal Analysis Information)

In this example, first, the signal feature analysis unit 170 obtains any one of the first consonant-likeness index values 1-1 to 1-3 of the current frame by the same method as that of any one of Examples 1 to 3. Then, if the obtained index value (that is, any one of the first index values 1-1 to 1-3) is greater than or equal to a predetermined threshold or exceeds the threshold, the signal feature analysis unit 170 outputs information indicating that the current frame is a consonant (pieces of "information indicating whether or not the current frame is a consonant", which correspond to the "first index value 1-1", the "first index value 1-2", and the "first index value 1-3", are also referred to as "first information 1-1", "first information 1-2", and "first information 1-3", respectively, for convenience in writing) as the signal analysis information $I_0$; otherwise, outputs any one of the pieces of first information 1-1 to 1-3, which indicates that the current frame is not a consonant, as the signal analysis information $I_0$.

(Example 5 of the Signal Feature Analysis Processing: An Example (2) in which Information Indicating Whether or not the Current Frame is a Consonant is Used as the Signal Analysis Information)

In this example, first, the signal feature analysis unit 170 obtains the first consonant-likeness index value 1-1 of the current frame by the same method as that of Example 1 (Step 5-1). Next, if the first index value 1-1 obtained in Step 5-1 is greater than or equal to a predetermined threshold or exceeds the threshold, the signal feature analysis unit 170 obtains the first information 1-1 indicating that the current frame is a consonant; otherwise, obtains the first information 1-1 indicating that the current frame is not a consonant (Step 5-2). Moreover, the signal feature analysis unit 170 obtains the first consonant-likeness index value 1-2 of the current frame by the same method as that of Example 2 (Step 5-3). If the first index value 1-2 obtained in Step 5-3 is greater than or equal to a predetermined threshold or exceeds the threshold, the signal feature analysis unit 170 obtains the first information 1-2 indicating that the current frame is a consonant; otherwise, obtains the first information 1-2 indicating the current frame is not a consonant (Step 5-4). Furthermore, if the first information 1-1 obtained in Step 5-2 indicates that the current frame is a consonant and the first information 1-2 obtained in Step 5-4 indicates that the current frame is a consonant, the signal feature analysis unit 170 outputs information (also referred to as "first information 1-4" for convenience in writing) indicating that the current frame is a consonant as the signal analysis information $I_0$; otherwise, outputs the first information 1-4 indicating that the current frame is not a consonant as the signal analysis information $I_0$ (Step 5-5).

In place of Step 5-5 described above, if the first information 1-1 obtained in Step 5-2 indicates that the current frame is a consonant or the first information 1-2 obtained in Step 5-4 indicates that the current frame is a consonant, the signal feature analysis unit 170 may output the first information 1-4 indicating that the current frame is a consonant as the signal analysis information $I_0$; otherwise, output the first information 1-4 indicating that the current frame is not a consonant as the signal analysis information $I_0$ (Step 5-5').

By these processing, the signal feature analysis unit 170 outputs the consonant-likeness index value or the information indicating whether or not the current frame is a consonant as the signal analysis information $I_0$.

[Pitch Enhancement Processing (S130)]

Next, the pitch enhancement processing which is performed by the speech pitch enhancement apparatus 100 will be described.

The pitch enhancement unit 130 receives the pitch period and the pitch gain which were output from the pitch analysis unit 120, the signal analysis information output from the signal feature analysis unit 170, and the time domain audio signal (input signal) of the current frame, which was input to the speech pitch enhancement apparatus 100. The pitch enhancement unit 130 outputs, for an audio signal sample sequence of the current frame, a sample sequence of an output signal obtained by enhancing a pitch component corresponding to the pitch period $T_0$ of the current frame such that the degree of enhancement, which is based on the pitch gain (o, in a consonant frame is made lower than the degree of enhancement in a non-consonant frame.

Hereinafter, a specific example will be described.

The pitch enhancement unit 130 performs the pitch enhancement processing on the sample sequence of the audio signal of the current frame using the input pitch gain $\sigma_0$ of the current frame, the input pitch period $T_0$ of the current frame, and the input signal analysis information $I_0$ of the current frame. Specifically, the pitch enhancement unit 130 obtains a sample sequence, which consists of N samples $X^{new}_{L-N}, \ldots, X^{new}_{L-1}$, of an output signal of the current frame by obtaining an output signal $X^{new}_n$ for each sample $X_n$ ($L-N \leq n \leq L-1$), which makes up the input sample sequence of the audio signal of the current frame, by Formula (8) below.

$$X_n^{new} = \frac{1}{A}\left[X_n + B_0\sigma_0\gamma_0X_{n-T_0}\right] \tag{8}$$

When the signal analysis information $I_0$ is information indicating whether or not the current frame is a consonant, an attenuation coefficient $\gamma_0$ is a predetermined value that is greater than 0 and less than 1 ($0<\gamma_0<1$) if the signal analysis information $I_0$ of the current frame indicates that the current frame is a consonant and the attenuation coefficient $\gamma_0$ is 1 ($\gamma_0=1$) if the signal analysis information $I_0$ of the current frame indicates that the current frame is not a consonant.

Moreover, when the signal analysis information $I_0$ of the current frame is the consonant-likeness index value, the attenuation coefficient $\gamma_0$ is a value that is determined based on the signal analysis information $I_0$ of the current frame, and is a value that becomes smaller as the consonant-likeness index value $I_0$ becomes larger. More specifically, for example, the attenuation coefficient $\gamma_0$ only has to be a value that becomes smaller as the consonant-likeness index value $I_0$ becomes larger and that is determined by a predetermined function $\gamma_0=f(I_0)$ which makes $\gamma_0=1$ hold if the consonant-likeness index value $I_0$ is the minimum value that the index value can take and makes $\gamma_0=0$ hold if the consonant-likeness index value $I_0$ is the maximum value that the index value can take.

Here, A in Formula (8) is an amplitude correction factor which is determined by Formula (9) below.

$$A=1+B_0^2\sigma_0^2\gamma_0^2 \tag{9}$$

Moreover, $B_0$ is a predetermined value and 3/4, for example.

The pitch enhancement processing of Formula (8) is processing that enhances a pitch component with consideration given not only to a pitch period but also to pitch gain, and processing that enhances a pitch component of a frame which is a consonant, making the degree of enhancement lower than the degree of enhancement of a pitch component of a frame which is not a consonant.

In other words, when the signal analysis information $I_0$ indicates whether or not the current frame is a consonant, in the pitch enhancement unit 130, for a frame (a time segment) judged to be a consonant, for each time n in the frame, a signal including a signal obtained by adding a signal, which was obtained by multiplying a signal $X_{n-T\_0}$ at a time $n-T_0$ that is an earlier time than the time n by the number of samples $T_0$ corresponding to a pitch period of the frame, the pitch gain $\sigma_0$ of the frame, a predetermined constant $B_0$, and a value that is greater than 0 and less than 1, and a signal $X_n$ at the time n is obtained as an output signal $X^{new}$. Moreover, in the pitch enhancement unit 130, for a frame (a time segment) judged to be a non-consonant, for each time n in the frame, a signal including a signal ($X_n+B_0\sigma_0X_{n-T\_0}$) obtained by adding a signal ($B_0\sigma_0X_{n-T\_0}$) (which corresponds to a signal obtained when $\gamma_0$ in the second term inside the brackets on the right side of Formula (8) is 1), which was obtained by multiplying a signal $X_{n-T\_0}$ at a time $n-T_0$ that is an earlier time than the time n by the number of samples $T_0$ corresponding to a pitch period of the frame, the pitch gain $\sigma_0$ of the frame, and a predetermined constant $B_0$, and a signal $X_n$ at the time n is obtained as an output signal $X^{new}_n$.

Moreover, when the signal analysis information $I_0$ is the consonant-likeness index value, in the pitch enhancement unit 130, for each time n in the frame, a signal including a signal ($X_n+B_0\gamma_0\sigma_0X_{n-T\_0}$) obtained by adding a signal ($B_0\sigma_0\gamma_0X_{n-T\_0}$), which was obtained by multiplying a signal $X_{n-T\_0}$ at a time $n-T_0$ that is an earlier time than the time n by the number of samples $T_0$ corresponding to a pitch period of a frame including a signal $X_n$, the pitch gain $\sigma_0$ of the frame, and a value $B_0\gamma_0$ that becomes smaller as the consonant-likeness of the frame becomes higher, and the signal $X_n$ at the time n is obtained as an output signal $X^{new}_n$.

By this pitch enhancement processing, it is possible to obtain the effect of making a consonant sound less unnatural even in a consonant frame and, even with frequent switching between a consonant frame and other frames, making a consonant, which may sound unnatural due to fluctuations in the degree of enhancement of a pitch component between frames, sound less unnatural.

[First Modification of the Pitch Enhancement Processing (S130)]

Next, a first modification of the pitch enhancement processing which is performed by the speech pitch enhancement apparatus 100 and related processing will be described.

The speech pitch enhancement apparatus 100 of the first modification further includes the pitch information storage 150. When the pitch information storage 150 is used in the signal feature analysis processing (S170), the pitch information storage 150 may be used in both the signal feature analysis processing (S170) and the pitch enhancement processing (S130).

The pitch enhancement unit 130 receives the pitch period and the pitch gain which were output from the pitch analysis unit 120, the signal analysis information output from the signal feature analysis unit 170, and the time domain audio signal of the current frame, which was input to the speech pitch enhancement apparatus 100. The pitch enhancement unit 130 outputs, for an audio signal sample sequence of the current frame, a sample sequence of an output signal obtained by enhancing a pitch component corresponding to the pitch period $T_0$ of the current frame and a pitch component corresponding to a pitch period of an earlier frame. In so doing, the pitch enhancement unit 130 enhances a pitch component corresponding to the pitch period $T_0$ of the current frame such that the degree of enhancement, which is based on the pitch gain $\sigma_0$ of the current frame, in a consonant frame is made lower than the degree of enhancement in a non-consonant frame. Here, in the following description, the pitch period and the pitch gain of the s-th frame previous to the current frame are written as $T_{-s}$ and $\sigma_{-s}$, respectively.

Pitch periods $T_{-1}, \ldots, T_{-\alpha}$ and pitch gains $\sigma_1, \ldots, \sigma_{-\alpha}$ of frames from the previous frame to the α-th frame previous to the current frame are stored in the pitch information storage 150. Here, α is a predetermined positive integer and 1, for example. Moreover, as described above, the pitch information storage 150 may be used in both the signal feature analysis processing (S170) and the pitch enhancement processing (S130). ε may be greater than α, ε may be less than α, or ε may be set so as to be equal to a and overlapping portions may be used in both the signal feature analysis processing (S170) and the pitch enhancement processing (S130) to the fullest extent possible.

The pitch enhancement unit 130 performs the pitch enhancement processing on the sample sequence of the audio signal of the current frame using the input pitch gain $\sigma_0$ of the current frame, the pitch gain $\sigma_{-\alpha}$ of the α-th frame previous to the current frame, which was read from the pitch information storage 150, the input pitch period $T_0$ of the current frame, the pitch period $T_{-\alpha}$ of the α-th frame previous to the current frame, which was read from the pitch information storage 150, and the input signal analysis information $I_0$ of the current frame.

Hereinafter, a specific example will be described.

First Specific Example of the First Modification of the Pitch Enhancement Processing In this specific example, the pitch enhancement unit 130 obtains a sample sequence, which consists of N samples $X^{new}_{L-N}, \ldots, X^{new}_{L-1}$, of an output signal of the current frame by obtaining an output signal $X^{new}$ for each sample $X_n$ ($L-N \le n \le L-1$), which makes up the input sample sequence of the audio signal of the current frame, by Formula (10) below.

$$X_n^{new} = \frac{1}{A}\left[X_n + B_0\sigma_0\gamma_0 X_{n-T_0} + B_{-\alpha}\sigma_{-\alpha}X_{n-T_{-\alpha}}\right] \tag{10}$$

When the signal analysis information $I_0$ is information indicating whether or not the current frame is a consonant, an attenuation coefficient $\gamma_0$ is a predetermined value that is greater than 0 and less than 1 ($0<\gamma_0<1$) if the signal analysis information $I_0$ of the current frame indicates that the current frame is a consonant and the attenuation coefficient $\gamma_0$ is 1 ($\gamma_0=1$) if the signal analysis information $I_0$ of the current frame indicates that the current frame is not a consonant.

Moreover, when the signal analysis information $I_0$ of the current frame is the consonant-likeness index value, the attenuation coefficient $\gamma_0$ is a value that is determined based on the signal analysis information $I_0$ of the current frame, and is a value that becomes smaller as the consonant-likeness index value $I_0$ becomes larger. More specifically, for example, the attenuation coefficient $\gamma_0$ only has to be a value that becomes smaller as the consonant-likeness index value $I_0$ becomes larger and that is determined by a predetermined function $\gamma_0=f(I_0)$ which makes $\gamma_0=1$ hold if the consonant-likeness index value $I_0$ is the minimum value that the index value can take and makes $\gamma_0=0$ hold if the consonant-likeness index value $I_0$ is the maximum value that the index value can take.

Here, A in Formula (10) is an amplitude correction factor which is determined by Formula (11) below.

$$A=\sqrt{1+B_0^2\sigma_0^2\gamma_0^2+B_{-\alpha}\sigma_{-\alpha}^2+2B_0B_{-\alpha}\sigma_0\sigma_{-\alpha}\gamma_0} \tag{11}$$

Moreover, $B_0$ and $B_{-\alpha}$ are predetermined values less than 1 and are ¾ and ¼, respectively, for example.

Second Specific Example of the First Modification of the Pitch Enhancement Processing In this specific example, the pitch enhancement unit 130 obtains a sample sequence, which consists of N samples $X^{new}_{L-N}, \ldots, X^{new}_{L-1}$, of an output signal of the current frame by obtaining an output signal $X^{new}_n$ for each sample $X_n$ ($L-N \le n \le L-1$), which makes up the input sample sequence of the audio signal of the current frame, by Formula (12) below.

$$X_n^{new} = \frac{1}{A}\left[X_n + B_0\sigma_0\gamma_0 X_{n-T_0} + B_{-\alpha}\sigma_{-\alpha}\gamma_{-\alpha}X_{n-T_{-\alpha}}\right] \tag{12}$$

Here, an attenuation coefficient $\gamma_0$ is the same as that of the first specific example and an attenuation coefficient $\gamma_{-\alpha}$ is an attenuation coefficient of the $\alpha$-th frame previous to the current frame. Since the attenuation coefficient $\gamma_{-\alpha}$ of the $\alpha$-th frame previous to the current frame is used in this specific example, the speech pitch enhancement apparatus 100 of this specific example further includes the attenuation coefficient storage 180. The attenuation coefficients $\gamma_{-1}, \ldots, \gamma_{-\alpha}$ of frames from the previous frame to the $\alpha$-th frame previous to the current frame are stored in the attenuation coefficient storage 180.

Here, A in Formula (12) is an amplitude correction factor which is determined by Formula (13) below.

$$A=\sqrt{1+B_0\sigma_0^2\gamma_0^2+B_{-\alpha}^2\sigma_{-\alpha}^2\gamma_{-\alpha}^2+2B_0B_{-\alpha}\sigma_0\sigma_{-\alpha}\gamma_0\gamma_{-\alpha}} \tag{13}$$

Moreover, $B_0$ and B-a are predetermined values less than 1 and are ¾ and ¼, respectively, for example.

(Third Specific Example of the First Modification of the Pitch Enhancement Processing)

In this specific example, the pitch enhancement unit 130 obtains a sample sequence, which consists of N samples $X^{new}_{L-N}, \ldots, X^{new}_{L-1}$, of an output signal of the current frame by obtaining an output signal $X^{new}_n$ for each sample $X_n$ ($L-N \le n \le L-1$), which makes up the input sample sequence of the audio signal of the current frame, by Formula (14) below.

$$X_n^{new} = \frac{1}{A}\left[X_n + B_0\sigma_0\gamma_0 X_{n-T_0} + B_{-\alpha}\sigma_{-\alpha}\gamma_0 X_{n-T_{-\alpha}}\right] \tag{14}$$

Here, an attenuation coefficient $\gamma_0$ is the same as that of the first and second specific examples.

Moreover, A in Formula (14) is an amplitude correction factor which is determined by Formula (15) below.

$$A=\sqrt{1+B_0^2\sigma_0^2\gamma_0^2+B_{-\alpha}^2\sigma_{-\alpha}^2\gamma_0^2+2B_0B_{-\alpha}\sigma_0\sigma_{-\alpha}\gamma_0^2} \tag{15}$$

Furthermore, $B_0$ and B-a are predetermined values less than 1 and are ¾ and ¼, respectively, for example.

This specific example is a configuration in which the attenuation coefficient $\gamma_0$ of the current frame is used in place of the attenuation coefficient $\gamma_{-\alpha}$ of the $\alpha$-th frame previous to the current frame of the second specific example. This configuration can eliminate the need for the speech pitch enhancement apparatus 100 to include the attenuation coefficient storage 180.

The pitch enhancement processing of the first modification is processing that enhances a pitch component with consideration given not only to a pitch period but also to pitch gain, processing that enhances a pitch component of a frame which is a consonant, making the degree of enhancement lower than the degree of enhancement of a pitch component of a frame which is not a consonant, and processing that enhances a pitch component corresponding to the pitch period $T_0$ of the current frame and, at the same time, also enhances a pitch component corresponding to the pitch period $T_{-\alpha}$ in an earlier frame, making the degree of enhancement slightly lower than the degree of enhancement of a pitch component corresponding to the pitch period $T_0$ of the current frame. By the pitch enhancement processing of the first modification, even when pitch enhancement processing is performed for every short time segment (frame), the effect of reducing discontinuity between frames caused by fluctuations in a pitch period can also be obtained.

When the signal analysis information $I_0$ is information indicating whether or not the current frame is a consonant, it is preferable that $B_0\gamma_0>B_{-\alpha}$ in Formula (10), $B_0\gamma_0>B_{-\alpha}\gamma_{-\alpha}$ in Formula (12), and $B_0>B_{-\alpha}$ in Formula (14). However, even when $B_0\gamma_0\le B_{-\alpha}$ in Formula (10), $B_0\gamma_0$ $B_{-\alpha}\gamma_{-\alpha}$ in Formula (12), and $B_0\le B_{-\alpha}$ in Formula (14), the effect of reducing discontinuity between frames caused by fluctuations in a pitch period can be obtained.

Moreover, when the signal analysis information $I_0$ is the consonant-likeness index value, it is preferable that $B_0>B_{-\alpha}$ in Formula (10), Formula (12), and Formula (14). However, even when $B_0\le B_{-\alpha}$, the effect of reducing discontinuity between frames caused by fluctuations in a pitch period can be obtained.

Furthermore, the amplitude correction factors A which are determined by Formula (11), Formula (13), and Formula (15) allow the energy of a pitch component to be preserved before and after pitch enhancement if the assumption is made that the pitch period $T_0$ of the current frame and the pitch period $T_{-\alpha}$ of the $\alpha$-th frame previous to the current frame are values sufficiently close to each other.

It is to be noted that the pitch information storage 150 updates the storage contents so that the pitch period and the pitch gain of the current frame can be used as the pitch period and the pitch gain of an earlier frame in processing which is performed on a subsequent frame by the pitch enhancement unit 130.

Moreover, when the speech pitch enhancement apparatus 100 includes the attenuation coefficient storage 180, the attenuation coefficient storage 180 updates the storage contents so that the attenuation coefficient of the current frame can be used as an attenuation coefficient of an earlier frame in processing which is performed on a subsequent frame by the pitch enhancement unit 130.

[Second Modification of the Pitch Enhancement Processing (S130)]

In the first modification, for an audio signal sample sequence of the current frame, a sample sequence of an output signal is obtained by enhancing a pitch component corresponding to the pitch period $T_0$ of the current frame and a pitch component corresponding to a pitch period of one earlier frame; alternatively, pitch components corresponding to pitch periods of a plurality of (two or more) earlier frames may be enhanced. In the following description, as an example of enhancement of pitch components corresponding to pitch periods of a plurality of earlier frames, by taking, as an example, a case where pitch components corresponding to pitch periods of two earlier frames are enhanced, a difference from the first modification will be described.

Pitch periods $T_{-1}, \ldots, T_{-\alpha}, \ldots, T_{-\beta}$ and pitch gains $\sigma_{-1}, \ldots, \sigma_{-\alpha}, \ldots, \sigma_{-\beta}$ of frames from the previous frame to the $\beta$-th frame previous to the current frame are stored in the pitch information storage 150. Here, $\beta$ is a predetermined positive integer greater than $\alpha$. For example, $\alpha$ is 1 and $\beta$ is 2. Moreover, as described above, the pitch information storage 150 may be used in both the signal feature analysis processing (S170) and the pitch enhancement processing (S130). $\varepsilon$ may be greater than $\beta$, $\varepsilon$ may be less than $\beta$, or $\varepsilon$ may be set so as to be equal to 3 and overlapping portions may be used in both the signal feature analysis processing (S170) and the pitch enhancement processing (S130) to the fullest extent possible.

The pitch enhancement unit 130 performs the pitch enhancement processing on the sample sequence of the audio signal of the current frame using the input pitch gain $\sigma_0$ of the current frame, the pitch gain $\sigma_{-\alpha}$ of the $\alpha$-th frame previous to the current frame, which was read from the pitch information storage 150, the pitch gain $\sigma_{-\beta}$ of the $\beta$-th frame previous to the current frame, which was read from the pitch information storage 150, the input pitch period $T_0$ of the current frame, the pitch period $T_{-\alpha}$ of the $\alpha$-th frame previous to the current frame, which was read from the pitch information storage 150, the pitch period $T_{-\beta}$ of the $\beta$-th frame previous to the current frame, which was read from the pitch information storage 150, and the input signal analysis information $I_0$ of the current frame.

Hereinafter, a specific example will be described.

First Specific Example of the Second Modification of the Pitch Enhancement Processing In this specific example, the pitch enhancement unit 130 obtains a sample sequence, which consists of N samples $X^{new}_{L-N}, \ldots, X^{new}_{L-1}$, of an output signal of the current frame by obtaining an output signal $X^{new}_n$ for each sample $X_n$ ($L-N \le n \le L-1$), which makes up the input sample sequence of the audio signal of the current frame, by Formula (16) below.

$$X_n^{new} = \frac{1}{A}\left[X_n + B_0\sigma_0\gamma_0 X_{n-T_0} + B_{-\alpha}\sigma_{-\alpha}X_{n-T-\alpha} + B_{-\beta}\sigma_{-\beta}X_{n-T-\beta}\right] \tag{16}$$

When the signal analysis information $I_0$ is information indicating whether or not the current frame is a consonant, an attenuation coefficient $\gamma_0$ is a predetermined value that is greater than 0 and less than 1 ($0<\gamma_0<1$) if the signal analysis information $I_0$ of the current frame indicates that the current frame is a consonant and the attenuation coefficient $\gamma_0$ is 1 ($\gamma_0=1$) if the signal analysis information $I_0$ of the current frame indicates that the current frame is not a consonant.

Moreover, when the signal analysis information $I_0$ of the current frame is the consonant-likeness index value, the attenuation coefficient $\gamma_0$ is a value that is determined based on the signal analysis information $I_0$ of the current frame, and is a value that becomes smaller as the consonant-likeness index value $I_0$ becomes larger. More specifically, for example, the attenuation coefficient $\gamma_0$ only has to be a value that becomes smaller as the consonant-likeness index value $I_0$ becomes larger and that is determined by a predetermined function $\gamma_0=f(I_0)$ which makes $\gamma_0=1$ hold if the consonant-likeness index value $I_0$ is the minimum value that the index value can take and makes $\gamma_0=0$ hold if the consonant-likeness index value $I_0$ is the maximum value that the index value can take.

Here, A in Formula (16) is an amplitude correction factor which is determined by Formula (17) below.

$$A=\sqrt{1+B_0^2\sigma_0^2\gamma_0^2+B_{-\alpha}^2\sigma_{-\alpha}^2+B_{-\beta}^2\sigma_{-\beta}^2+E+F+G} \tag{17}$$

where $E=2B_0B_{-\alpha}\sigma_0\sigma_{-\alpha}\gamma_0$ $F=2B_0B_{-\beta}\sigma_0\sigma_{-\beta}\gamma_0$ $G=2B_{-\alpha}B_{-\beta}\sigma_{-\alpha}\sigma_{-\beta}$ Moreover, $B_0$, $B_{-\alpha}$, and $B_{-\beta}$ are predetermined values less than 1 and are 3/4, 3/16, and 1/16, respectively, for example.

Second Specific Example of the Second Modification of the Pitch Enhancement Processing In this specific example, the pitch enhancement unit 130 obtains a sample sequence, which consists of N samples $X^{new}_{L-N}, \ldots, X^{new}_{L-1}$, of an output signal of the current frame by obtaining an output signal $X^{new}$ for each sample $X_n$ ($L-N \le n \le L-1$), which makes up the input sample sequence of the audio signal of the current frame, by Formula (18) below.

$$X_n^{new} = \frac{1}{A}\left[X_n + B_0\sigma_0\gamma_0 X_{n-T_0} + B_{-\alpha}\sigma_{-\alpha}\gamma_{-\alpha}X_{n-T-\alpha} + B_{-\beta}\sigma_{-\beta}\gamma_{-\beta}X_{n-T-\beta}\right] \tag{18}$$

Here, an attenuation coefficient $\gamma_0$ is the same as that of the first specific example, an attenuation coefficient $\gamma_\alpha$ is an attenuation coefficient of the $\alpha$-th frame previous to the current frame, and an attenuation coefficient $\gamma_{-\beta}$ is an attenuation coefficient of the $\beta$-th frame previous to the current frame. Since the attenuation coefficient $\gamma_{-\alpha}$ of the $\alpha$-th frame previous to the current frame and the attenuation coefficient $\gamma_{-\beta}$ of the β-th frame previous to the current frame are used in this specific example, the speech pitch enhancement apparatus 100 of this specific example further includes the attenuation coefficient storage 180. The attenuation coefficients $\gamma_{-1}, \ldots, \gamma_{-\beta}$ of frames from the previous frame to the β-th frame previous to the current frame are stored in the attenuation coefficient storage 180.

Here, A in Formula (18) is an amplitude correction factor which is determined by Formula (19) below.

$$A=\sqrt{1+B_0{}^2\sigma_0{}^2\gamma_0{}^2+B_{-\alpha}{}^2\sigma_{-\alpha}{}^2\gamma_{-\alpha}{}^2+B_{-\beta}{}^2\sigma_{-\beta}{}^2\gamma_{-\beta}{}^2+E+F+G} \quad (19)$$

where $E=2B_0B_{-\alpha}\sigma_0\sigma_{-\alpha}\gamma_0\gamma_{-\alpha}$ $F=2B_0B_{-\beta}\sigma_0\sigma_{-\beta}\gamma_0\gamma_{-\beta}$ $G=2B_{-\alpha}B_{-\beta}\sigma_{-\alpha}\sigma_{-\beta}\gamma_{-\alpha}\gamma_{-\beta}$ Moreover, $B_0$, $B_{-\alpha}$, and $B_{-\beta}$ are predetermined values less than 1 and are ¾, 3/16, and 1/16, respectively, for example.

Third Specific Example of the Second Modification of the Pitch Enhancement Processing In this specific example, the pitch enhancement unit 130 obtains a sample sequence, which consists of N samples $X^{new}_{L-N}, \ldots, X^{new}_{L-1}$, of an output signal of the current frame by obtaining an output signal $X^{new}_n$ for each sample $X_n$ ($L-N \le n \le L-1$), which makes up the input sample sequence of the audio signal of the current frame, by Formula (20) below.

$$X_n^{new} = \frac{1}{A}\left[X_n + B_0\sigma_0\gamma_0X_{n-T_0} + B_{-\alpha}\sigma_{-\alpha}\gamma_0X_{n-T_{-\alpha}} + B_{-\beta}\sigma_{-\beta}\gamma_0X_{n-T_{-\beta}}\right] \quad (20)$$

Here, an attenuation coefficient $\gamma_0$ is the same as that of the first and second specific examples.

Moreover, A in Formula (20) is an amplitude correction factor which is determined by Formula (21) below.

$$A=\sqrt{1+B_0{}^2\sigma_0{}^2\gamma_0{}^2+B_{-+}{}^2\sigma_{-\alpha}{}^2\gamma_0{}^1+B_{-\beta}{}^2\sigma_{-\beta}{}^2\gamma_0{}^2+E+F+G} \quad (21)$$

where $E=2B_0B_{-\alpha}\sigma_0\sigma_{-\alpha}\gamma_0{}^2$ $F=2B_0B_{-=}\sigma_0\sigma_{-\beta}\gamma_0{}^2$ $F=2B_{-\alpha}B_{-\beta}\sigma_{-\alpha}\sigma_{-\beta}\gamma_0{}^2$ Moreover, $B_0$, $B_{-\alpha}$, and $B_{-\beta}$ are predetermined values less than 1 and are ¾, 3/16, and 1/16, respectively, for example.

This specific example is a configuration in which the attenuation coefficient $\gamma_0$ of the current frame is used in place of the attenuation coefficient $\gamma_{-\alpha}$ of the α-th frame previous to the current frame and the attenuation coefficient $\gamma_{-\beta}$ of the β-th frame previous to the current frame of the second specific example. This configuration can eliminate the need for the speech pitch enhancement apparatus 100 to include the attenuation coefficient storage 180.

As in the case of the pitch enhancement processing of the first modification, the pitch enhancement processing of the second modification is also processing that enhances a pitch component with consideration given not only to a pitch period but also to pitch gain, processing that enhances a pitch component of a frame which is a consonant, making the degree of enhancement lower than the degree of enhancement of a pitch component of a frame which is not a consonant, and processing that enhances a pitch component corresponding to the pitch period $T_0$ of the current frame and, at the same time, also enhances a pitch component corresponding to a pitch period in an earlier frame, making the degree of enhancement slightly lower than the degree of enhancement of a pitch component corresponding to the pitch period $T_0$ of the current frame. By the pitch enhancement processing of the second modification, even when pitch enhancement processing is performed for every short time segment (frame), the effect of reducing discontinuity between frames caused by fluctuations in a pitch period can also be obtained.

When the signal analysis information $I_0$ is information indicating whether or not the current frame is a consonant, it is preferable that $B_0\gamma_0>B_{-\alpha}>B_{-\beta}$ in Formula (16), $B_0\gamma_0>B_{-\alpha}\gamma_{-\alpha}>B_{-\beta}\gamma_{-\beta}$ in Formula (18), and $B_0>B_{-\alpha}>B_{-\beta}$ in Formula (20). However, even when $B_0\gamma_0\ B_{-\alpha}$, $B_0\gamma_0\ B_{-\beta}$, or $B_{-\alpha}\ B_{-\beta}$ in Formula (16), $B_0\gamma_0\ B_{-\alpha}\gamma_{-\alpha}$, $B_0\gamma_0\le B_{-\beta}\gamma_{-\beta}$, or $B_{-\alpha}\gamma_\alpha\le B_{-\beta}\gamma_{-\beta}$ in Formula (18), and $B_0\le B_{-\alpha}$, $B_0\le B_{-\beta}$, or $B_{-\alpha}\le B_{-\beta}$ in Formula (20), the effect of reducing discontinuity between frames caused by fluctuations in a pitch period can be obtained.

Moreover, when the signal analysis information $I_0$ is the consonant-likeness index value, it is preferable that $B_0>B_{-\alpha}>B_{-\beta}$ in Formula (16), Formula (18), and Formula (20). However, even when this magnitude relationship is not satisfied, the effect of reducing discontinuity between frames caused by fluctuations in a pitch period can be obtained.

Furthermore, the amplitude correction factors A which are determined by Formula (17), Formula (19), and Formula (21) allow the energy of a pitch component to be preserved before and after pitch enhancement if the assumption is made that the pitch period $T_0$ of the current frame, the pitch period $T_{-\alpha}$ of the α-th frame previous to the current frame, and the pitch period $T_{-\beta}$ of the β-th frame previous to the current frame are values sufficiently close to one another.

(Other Modifications of the Pitch Enhancement Processing)

In place of a value which is determined by Formula (9), Formula (11), Formula (13), Formula (15), Formula (17), Formula (19), or Formula (21), a predetermined value which is greater than or equal to 1 may be used as the amplitude correction factor A. When the amplitude correction factor A is set at 1, the pitch enhancement unit 130 may obtain an output signal $X^{new}_n$ by a formula without 1/A (that is, 1/A in Formula (8), Formula (10), Formula (12), Formula (14), Formula (16), Formula (18), and Formula (20)), which is included in the above-described formulae by which an output signal $X^{new}_n$ is obtained.

Moreover, in place of a value based on an earlier sample than each sample by each pitch period, which is added to each sample of an input audio signal, for example, an earlier sample than each sample by each pitch period in an audio signal that was passed through a low-pass filter may be used or processing equivalent to a low-pass filter may be performed.

Furthermore, when pitch gain is less than a predetermined threshold, pitch enhancement processing that does not include the pitch component may be performed. For example, a configuration may be adopted in which, when the pitch gain $\sigma_0$ of the current frame is less than a predetermined threshold, a pitch component corresponding to the pitch period $T_0$ of the current frame is not included in an output signal and, when the pitch gain of an earlier frame is less than the predetermined threshold, a pitch component corresponding to a pitch period of the earlier frame is not included in the output signal.

Furthermore, a configuration may be adopted in which the signal feature analysis unit 170 obtains the consonant-likeness index value and outputs the consonant-likeness index value to the pitch enhancement unit 130 as the signal analysis information $I_0$ and the pitch enhancement unit 130 changes the degree of enhancement (the magnitude of the attenuation coefficient $\gamma_0$) in two levels based on the magnitude relationship between the consonant-likeness index value and a threshold.

Second Embodiment

A difference from the first embodiment will be mainly described.

In the present embodiment, in place of the consonant-likeness index value described in the first embodiment, a spectral envelope flatness index value is obtained as the consonant-likeness index value. The spectral envelope of the spectrum of a consonant has the property of being flatter than the spectral envelope of the spectrum of a vowel. In the present embodiment, by using this property, the spectral envelope flatness index value is used as the consonant-likeness index value.

The details of the signal feature analysis processing (S170) are different from those of the first embodiment.

[Signal Feature Analysis Processing (S170)]

As in the case of the first embodiment, information derived from a time domain audio signal is input to the signal feature analysis unit 170.

The signal feature analysis unit 170 obtains information indicating whether or not the current frame is a consonant or the consonant-likeness index value of the current frame and outputs the information or the consonant-likeness index value to the pitch enhancement unit 130 as the signal analysis information $I_0$. In the present embodiment, as described above, the spectral envelope flatness index value of the current frame is used as the consonant-likeness index value of the current frame. Moreover, in the present embodiment, information indicating whether or not the spectral envelope of the current frame is flat is used as the information indicating whether or not the current frame is a consonant.

The signal feature analysis unit 170 obtains the signal analysis information $I_0$ by, for example, signal feature analysis processing of Examples 2-1 to 2-7 below.

(Example 2-1 of the Signal Feature Analysis Processing: An Example (1) in which the Spectral Envelope Flatness Index Value is Used as the Signal Analysis Information)

In this example, first, the signal feature analysis unit 170 obtains T-th order LSP parameters θ[1], θ[2], . . . , θ[T] from a sample sequence of the latest J audio signal samples including the input N time domain audio signal samples (Step 2-1-1). The signal feature analysis unit 170 then obtains, using the T-th order LSP parameters θ[1], θ[2], . . . , θ[T] obtained in Step 2-1-1, the following index Q as the spectral envelope flatness index value (also referred to as the "second consonant-likeness index value 2-1" for convenience in writing) of the current frame (Step 2-1-2).

$$Q = \frac{1}{\frac{1}{(T-1)}\sum_{i}^{T-1}\left(\bar{\theta} - \theta[i+1] + \theta[i]\right)^2} \text{ where} \tag{31}$$

$$\bar{\theta} = \frac{1}{(T-1)}\sum_{i}^{T-1}(\theta[i+1] - \theta[i])$$

(Example 2-2 of the Signal Feature Analysis Processing: An Example (2) in which the Spectral Envelope Flatness Index Value is Used as the Signal Analysis Information)

In this example, first, the signal feature analysis unit 170 obtains T-th order LSP parameters θ[1], θ[2], . . . , θ[T] from a sample sequence of the latest J audio signal samples including the input N time domain audio signal samples (Step 2-2-1). The signal feature analysis unit 170 then obtains, using the T-th order LSP parameters θ[1], θ[2], . . . , θ[T] obtained in Step 2-2-1, the minimum value of the intervals between adjacent LSP parameters, that is, the following index Q' as the spectral envelope flatness index value (also referred to as the "second consonant-likeness index value 2-2" for convenience in writing) of the current frame (Step 2-2-2).

$$Q' = \min_{i \in \{1, \ldots, T-1\}}(\theta[i+1] - \theta[i]) \tag{32}$$

(Example 2-3 of the Signal Feature Analysis Processing: An Example (3) in which the Spectral Envelope Flatness Index Value is Used as the Signal Analysis Information)

In this example, first, the signal feature analysis unit 170 obtains T-th order LSP parameters θ[1], θ[2], . . . , θ[T] from a sample sequence of the latest J audio signal samples including the input N time domain audio signal samples (Step 2-3-1). The signal feature analysis unit 170 then obtains, using the T-th order LSP parameters θ[1], θ[2], . . . , θ[T] obtained in Step 2-3-1, the minimum value of the values of the intervals of adjacent LSP parameters and the value of the lowest order LSP parameter, that is, the following index Q" as the spectral envelope flatness index value (also referred to as the "second consonant-likeness index value 2-3" for convenience in writing) of the current frame (Step 2-3-2).

$$Q'' = \min(\min_{i \in \{1, \ldots, T-1\}} (\theta[i+1] - \theta[i]), \theta[1]) \tag{33}$$

(Example 2-4 of the Signal Feature Analysis Processing: An Example (4) in which the Spectral Envelope Flatness Index Value is Used as the Signal Analysis Information)

In this example, first, the signal feature analysis unit 170 obtains p-th order PARCOR coefficients k[1], k[2], . . . , k[p] from a sample sequence of the latest J audio signal samples including the input N time domain audio signal samples (Step 2-4-1). The signal feature analysis unit 170 then obtains, using the p-th order PARCOR coefficients k[1], k[2], . . . , k[p] obtained in Step 2-4-1, the following index Q" as the spectral envelope flatness index value (also referred to as the "second consonant-likeness index value 2-4" for convenience in writing) of the current frame (Step 2-4-2).

$$Q''' = \prod_{i}^{p}\left(1 - k[i]^2\right) \tag{34}$$

Example 2-5 of the Signal Feature Analysis Processing: An Example in which an Index Value Obtained by Combining a Plurality of Index Values is Used as the Signal Analysis Information In this example, the signal feature analysis unit 170 obtains the second consonant-likeness index values 2-1 to 2-4 by the methods of Examples 2-1 to 2-4 (Step 2-5-1). Furthermore, the signal feature analysis unit 170 obtains, by the weighted addition of the second consonant-likeness index values 2-1 to 2-4 obtained in Step 2-5-1, a value that becomes larger as the second index value 2-1 becomes larger, that becomes larger as the second index value 2-2 becomes larger, that becomes larger as the second index value 2-3 becomes larger, and that becomes larger as the second index value 2-4 becomes larger as the spectral envelope flatness index value (also referred to as the "second consonant-likeness index value 2-5" for convenience in writing) of the current frame, and outputs the obtained second index value 2-5 as the signal analysis information $I_0$ (Step 2-5-2).

As described earlier, the second consonant-likeness index values 2-1 to 2-4 are each an index indicating the flatness of a spectral envelope. In this example, by combining the four index values, it is possible to more flexibly set an index value indicating the flatness of a spectral envelope.

It is to be noted that the signal feature analysis unit 170 may obtain at least two of the second consonant-likeness index values 2-1 to 2-4 (Step 2-5-1'). In this case, the signal feature analysis unit 170 may obtain, by the weighted addition of the at least two consonant-likeness index values obtained in Step 2-5-1', a value that becomes larger as each of the index values obtained in Step 2-5-1' becomes larger as the second consonant-likeness index value 2-5 of the current frame and output the obtained second index value 2-5 as the signal analysis information $I_0$ (Step 2-5-2').

In Examples 2-1 to 2-5 of the signal feature analysis processing, the examples in which the consonant-likeness index value (the spectral envelope flatness index value) is used as the signal analysis information have been described. The following description deals with an example in which information indicating whether or not the current frame is a consonant (information indicating whether or not a spectral envelope is flat) is used as the signal analysis information.

(Example 2-6 of the Signal Feature Analysis Processing: An Example (1) in which Information Indicating Whether or not a Spectral Envelope is Flat is Used as the Signal Analysis Information)

In this example, first, the signal feature analysis unit 170 obtains any one of the second consonant-likeness index values 2-1 to 2-5 of the current frame by the same method as that of any one of Examples 2-1 to 2-5 (Step 2-6-1). Then, if the index value obtained in Step 2-6-1 is greater than or equal to a predetermined threshold or exceeds the threshold, the signal feature analysis unit 170 outputs information indicating that the current frame is a consonant (pieces of "information indicating whether or not the current frame is a consonant", which correspond to the "second index value 2-1", the "second index value 2-2", the "second index value 2-3", the "second index value 2-4", and the "second index value 2-5", are also referred to as "second information 2-1", "second information 2-2", "second information 2-3", "second information 2-4", and "second information 2-5", respectively, for convenience in writing) as the signal analysis information $I_0$; otherwise, outputs any one of the pieces of second information 2-1 to 2-5, which indicates that the current frame is not a consonant, as the signal analysis information $I_0$ (Step 2-6-2).

(Example 2-7 of the Signal Feature Analysis Processing: An Example (2) in which Information Indicating Whether or not a Spectral Envelope is Flat is Used as the Signal Analysis Information)

In this example, first, the signal feature analysis unit 170 obtains the second consonant-likeness index values 2-1 to 2-4 of the current frame by the same methods as those of Examples 2-1 to 2-4 (Step 2-7-1). Then, based on the magnitude relationship between each of the four second consonant-likeness index values 2-1 to 2-4 obtained in Step 2-7-1 and a predetermined threshold, the signal feature analysis unit 170 obtains, for each of the second consonant-likeness index values 2-1 to 2-4, information indicating that the current frame is a consonant or information indicating that the current frame is not a consonant (Step 2-7-2). It is assumed that the threshold is set for each of the four second index values 2-1 to 2-4, and pieces of information indicating whether or not the current frame is a consonant, which correspond to the second index value 2-1, the second index value 2-2, the second index value 2-3, and the second index value 2-4, are also referred to as second information 2-1, second information 2-2, second information 2-3, and second information 2-4, respectively. For example, if the second index value 2-1 is greater than or equal to a predetermined threshold or exceeds the threshold, the signal feature analysis unit 170 obtains the second information 2-1 indicating that the current frame is a consonant; otherwise, obtains the second information 2-1 indicating that the current frame is not a consonant. The signal feature analysis unit 170 obtains the second information 2-2 to 2-4 based on the magnitude relationship between each of the second index values 2-2 to 2-4 and a predetermined threshold in a similar way.

Based on the logical operation of the four pieces of second information 2-1 to 2-4, the signal feature analysis unit 170 obtains information (also referred to as "second information 2-6" for convenience in writing) indicating that the current frame is a consonant or the second information 2-6 indicating that the current frame is not a consonant (Step 2-7-3).

Example 1 of the Logical Operation

For example, if all of the pieces of second information 2-1 to 2-4 indicate that the current frame is a consonant, the signal feature analysis unit 170 outputs the second information 2-6 indicating that the current frame is a consonant as the signal analysis information $I_0$; otherwise, outputs the second information 2-6 indicating that the current frame is not a consonant as the signal analysis information $I_0$.

Example 2 of the Logical Operation

Moreover, for example, if any one of the pieces of second information 2-1 to 2-4 indicates that the current frame is a consonant, the signal feature analysis unit 170 outputs the second information 2-6 indicating that the current frame is a consonant as the signal analysis information $I_0$; otherwise, outputs the second information 2-6 indicating that the current frame is not a consonant as the signal analysis information $I_0$.

Example 3 of the Logical Operation

Furthermore, for example, if any one of the pieces of second information 2-1 and 2-2 indicates that the current frame is a consonant and any one of the pieces of second information 2-3 and 2-4 indicates that the current frame is a consonant (if a combination of OR and AND is used), the signal feature analysis unit 170 outputs the second information 2-6 indicating that the current frame is a consonant as the signal analysis information $I_0$; otherwise, outputs the second information 2-6 indicating that the current frame is not a consonant as the signal analysis information $I_0$.

It is to be noted that the logical operation of the pieces of second information 2-1 to 2-4 is not limited to Examples 1 to 3 of the logical operation described above and the logical operation of the pieces of second information 2-1 to 2-4 may be appropriately set in such a way as to make a decoded audio signal sound more natural.

Moreover, the signal feature analysis unit 170 may obtain at least two of the second consonant-likeness index values 2-1 to 2-4 (Step 2-7-1'). In this case, based on the magnitude relationship between each of the at least two consonant-likeness index values obtained in Step 2-7-1' and a predetermined threshold, the signal feature analysis unit 170 may obtain, for each consonant-likeness index value, at least two pieces of information: information indicating that the current frame is a consonant or information indicating that the current frame is not a consonant (Step 2-7-2'). Furthermore, based on the logical operation of the at least two pieces of information obtained in Step 2-7-2', the signal feature analysis unit 170 may obtain the second information 2-6 indicating that the current frame is a consonant or the second information 2-6 indicating that the current frame is not a consonant (Step 2-7-3').

By these processing, the signal feature analysis unit 170 outputs the consonant-likeness index value or the information indicating whether or not the current frame is a consonant as the signal analysis information $I_0$.

<Pitch Enhancement Unit 130>

The pitch enhancement processing (S130) in the pitch enhancement unit 130 is similar to that of the first embodiment.

In other words, when the signal analysis information $I_0$ indicates whether or not a spectral envelope is flat (whether or not the current frame is a consonant), for a frame (a time segment) whose spectral envelope (to be more specific, the spectral envelope of a frame including a signal $X_n$) was judged to be flat (for a frame (a time segment) judged to be a consonant), the pitch enhancement unit 130 of the present embodiment obtains, for each time n of the frame, as an output signal $X^{new}$, a signal including a signal obtained by adding a signal, which was obtained by multiplying a signal $X_{n-T\_0}$ at a time $n-T_0$ that is an earlier time than the time n by the number of samples $T_0$ corresponding to a pitch period of the frame, the pitch gain $\sigma_0$ of the frame, a predetermined constant $B_0$, and a value that is greater than 0 and less than 1, and the signal $X_n$ at the time n. Moreover, for a frame (a time segment) whose spectral envelope was judged not to be flat (for a frame (a time segment) judged to be a non-consonant), the pitch enhancement unit 130 obtains, for each time n of the frame, as an output signal $X^{new}{}_n$, a signal including a signal $(X_n+B_0\sigma_0X_{n-T\_0})$ obtained by adding a signal $(B_0\sigma_0X_{n-T\_0})$ (which corresponds to a signal obtained when $\gamma_0$ in the second term inside the brackets on the right side of Formula (8) is 1), which was obtained by multiplying a signal $X_{n-T\_0}$ at a time $n-T_0$ that is an earlier time than the time n by the number of samples $T_0$ corresponding to a pitch period of the frame, the pitch gain $\sigma_0$ of the frame, and a predetermined constant $B_0$, and the signal $X_n$ at the time n.

Furthermore, when the signal analysis information $I_0$ is the spectral envelope flatness index value (the consonant-likeness index value), in the pitch enhancement unit 130, for each time n of a frame, a signal including a signal $(X_n+B_0\gamma_0\sigma_0X_{n-T\_0})$ obtained by adding a signal $(B_0\sigma_0\gamma_0X_{n-T\_0})$, which was obtained by multiplying a signal $X_{n-T\_0}$ at a time $n-T_0$ that is an earlier time than the time n by the number of samples $T_0$ corresponding to a pitch period of a frame including a signal $X_a$, the pitch gain $\sigma_0$ of the frame, and a value $B_0\gamma_0$ that becomes smaller as the flatness of the spectral envelope of the frame becomes higher (as the consonant-likeness of the frame becomes higher), and the signal $X_n$ at the time n is obtained as an output signal $X^{new}$.

Effects

The above-described configuration makes it possible to obtain the effects similar to those of the first embodiment.

Third Embodiment

A difference from the first embodiment will be mainly described.

In the present embodiment, by using, in addition to the consonant-likeness index value described in the first embodiment, the spectral envelope flatness index value described in the second embodiment, a consonant-likeness index value or information indicating whether or not the current frame is a consonant is obtained.

The details of the signal feature analysis processing (S170) are different from those of the first embodiment. In the following description, for convenience in writing, any one of the first consonant-likeness index values 1-1 to 1-3 described in the first embodiment is referred to as a first consonant-likeness index value, any one of the second consonant-likeness index values 2-1 to 2-5, which are the spectral envelope flatness index values, described in the second embodiment is referred to as a second index value, and a consonant-likeness index value which is obtained by the signal feature analysis processing (S170) using the first consonant-likeness index value and the second consonant-likeness index value is referred to as a third consonant-likeness index value.

[Signal Feature Analysis Processing (S170)]

Based on the consonant-likeness index value described in the first embodiment and the spectral envelope flatness index value described in the second embodiment, the signal feature analysis unit 170 obtains a consonant-likeness index value or information indicating whether or not the current frame is a consonant and outputs the consonant-likeness index value or the information to the pitch enhancement unit 130 as the signal analysis information. The signal feature analysis unit 170 obtains the signal analysis information $I_0$ by signal feature analysis processing of Examples 3-1 to 3-4 below, for example.

(Example 3-1 of the Signal Feature Analysis Processing: An Example in which an Index Value Obtained by Combining the First Consonant-Likeness Index Value and the Spectral Envelope Flatness Index Value (the Second Consonant-Likeness Index Value) is Used as the Third Consonant-Likeness Index Value and the Third Index Value Itself is Used as the Signal Analysis Information)

In this example, first, the signal feature analysis unit 170 obtains the first consonant-likeness index value of the current frame by the same method as that of any one of Examples 1 to 3 described in the first embodiment (Step 3-1-1). Moreover, the signal feature analysis unit 170 obtains the spectral envelope flatness index value (the second consonant-likeness index value) of the current frame by any one of the methods of Examples 2-1 to 2-5 described in the second embodiment (Step 3-1-2). Furthermore, the signal feature analysis unit 170 obtains, by, for example, the weighted addition of the first consonant-likeness index value obtained in Step 3-1-1 and the spectral envelope flatness index value (the second consonant-likeness index value) obtained in Step 3-1-2, a value that becomes larger as the first consonant-likeness index value becomes larger and that becomes larger as the spectral envelope flatness index value (the second consonant-likeness index value) becomes larger as the third consonant-likeness index value of the current frame, and outputs the obtained third consonant-likeness index value as the signal analysis information $I_0$ (Step 3-1-3).

(Example 3-2 of the Signal Feature Analysis Processing: An Example in which Information Obtained by Making a Judgment, Based on a Threshold, about the Third Index Value Obtained by Combining the First Consonant-Likeness Index Value and the Spectral Envelope Flatness Index Value (the Second Consonant-Likeness Index Value) is Used as the Signal Analysis Information)

In this example, first, the signal feature analysis unit 170 obtains the third consonant-likeness index value of the current frame by the same method as that of Example 3-1 (Step 3-2-1). Then, if the third consonant-likeness index value obtained in Step 3-2-1 is greater than or equal to a predetermined threshold or exceeds the threshold, the signal feature analysis unit 170 outputs third information indicating that the current frame is a consonant as the signal analysis information $I_0$; otherwise, outputs third information indicating that the current frame is not a consonant as the signal analysis information $I_0$.

Example 3-3 of the Signal Feature Analysis Processing: An Example in which Information Indicating Whether or not the Current Frame is a Consonant or a Spectral Envelope is Flat is Used as the Signal Analysis Information In this example, first, the signal feature analysis unit 170 obtains the first consonant-likeness index value of the current frame by the same method as that of any one of Examples 1 to 3 described in the first embodiment (Step 3-3-1). If the first index value obtained in Step 3-3-1 is greater than or equal to a predetermined threshold or exceeds the threshold, the signal feature analysis unit 170 obtains first information indicating that the current frame is a consonant; otherwise, obtains first information indicating that the current frame is not a consonant (Step 3-3-2). Moreover, the signal feature analysis unit 170 obtains the spectral envelope flatness index value (the second consonant-likeness index value) of the current frame by any one of the methods of Examples 2-1 to 2-5 described in the second embodiment (Step 3-3-3). If the second index value obtained in Step 3-3-3 is greater than or equal to a predetermined threshold or exceeds the threshold, the signal feature analysis unit 170 obtains second information indicating that the spectral envelope of the current frame is flat (the current frame is a consonant); otherwise, obtains second information indicating that the spectral envelope of the current frame is not flat (the current frame is not a consonant) (Step 3-3-4). Furthermore, if the first information obtained in Step 3-3-2 indicates that the current frame is a consonant or the second information obtained in Step 3-3-4 indicates that the spectral envelope is flat (the current frame is a consonant), the signal feature analysis unit 170 outputs third information indicating that the current frame is a consonant as the signal analysis information $I_0$; otherwise, outputs third information indicating that the current frame is not a consonant as the signal analysis information $I_0$.

Example 3-4 of the Signal Feature Analysis Processing: An Example in which Information Indicating Whether or not the Current Frame is a Consonant and a Spectral Envelope is Flat is Used as the Signal Analysis Information In this example, first, the signal feature analysis unit 170 obtains the first consonant-likeness index value of the current frame by the same method as that of any one of Examples 1 to 3 described in the first embodiment (Step 3-4-1). If the index value obtained in Step 3-4-1 is greater than or equal to a predetermined threshold or exceeds the threshold, the signal feature analysis unit 170 obtains first information indicating that the current frame is a consonant; otherwise, obtains first information indicating that the current frame is not a consonant (Step 3-4-2). Moreover, the signal feature analysis unit 170 obtains the spectral envelope flatness index value (the second consonant-likeness index value) of the current frame by any one of the methods of Examples 2-1 to 2-5 described in the second embodiment (Step 3-4-3). If the index value obtained in Step 3-4-3 is greater than or equal to a predetermined threshold or exceeds the threshold, the signal feature analysis unit 170 obtains second information indicating that the spectral envelope of the current frame is flat (the current frame is a consonant); otherwise, obtains second information indicating that the spectral envelope of the current frame is not flat (the current frame is not a consonant) (Step 3-4-4). Furthermore, if the first information obtained in Step 3-4-2 indicates that the current frame is a consonant and the second information obtained in Step 3-4-4 indicates that the spectral envelope is flat, the signal feature analysis unit 170 outputs third information indicating that the current frame is a consonant as the signal analysis information $I_0$; otherwise, outputs third information indicating that the current frame is not a consonant as the signal analysis information $I_0$.

<Pitch Enhancement Unit 130>

The pitch enhancement processing (S130) in the pitch enhancement unit 130 is similar to that of the first embodiment.

In other words, when the signal analysis information $I_0$ indicates whether or not the current frame is a consonant (when the signal analysis information $I_0$ is the third information), for a frame (a time segment) judged to be a consonant or/and judged to be a frame (a time segment) including a signal $X_n$ whose spectral envelope is flat, the pitch enhancement unit 130 of the present embodiment obtains, for each time n of the frame, as an output signal $X^{new}_n$, a signal including a signal obtained by adding a signal, which was obtained by multiplying a signal $X_{n-T\_0}$ at a time $n-T_0$ that is an earlier time than the time n by the number of samples $T_0$ corresponding to a pitch period of the frame, the pitch gain $\sigma_0$ of the frame, a predetermined constant $B_0$, and a value that is greater than 0 and less than 1, and the signal $X_n$ at the time n. Moreover, for a frame about which a judgment other than that described above has been made, the pitch enhancement unit 130 obtains, for each time n of the frame, as an output signal $X^{new}_n$, a signal including a signal $(X_n+B_0\sigma_0X_{n-T\_0})$ obtained by adding a signal $(B_0\sigma_0X_{n-T\_0})$ (which corresponds to a signal obtained when $\gamma_0$ in the second term inside the brackets on the right side of Formula (8) is 1), which was obtained by multiplying a signal $X_{n-T\_0}$ at a time $n-T_0$ that is an earlier time than the time n by the number of samples $T_0$ corresponding to a pitch period of the frame, the pitch gain $\sigma_0$ of the frame, and a predetermined constant $B_0$, and the signal $X_n$ at the time n (which corresponds to Examples 3-3 and 3-4). In Example 3-2, a judgment about the third index value obtained by combining the first consonant-likeness index value and the spectral envelope flatness index value (the second consonant-likeness index value) is made based on a threshold, and this judgment based on a threshold corresponds to making a judgment whether or not the current frame is a consonant or/and the spectral envelope of a signal $X_n$ is flat.

Moreover, when the signal analysis information $I_0$ is the consonant-likeness index value (when the signal analysis information $I_0$ is the third index value), in the pitch enhancement unit 130, for each time n of a frame, a signal including a signal $(X_n+B_0\gamma_0\sigma_0X_{n-T\_0})$ obtained by adding a signal $(B_0\sigma_0\gamma_0X_{n-T\_0})$, which was obtained by multiplying a signal $X_{n-T\_0}$ at a time $n-T_0$ that is an earlier time than the time n by the number of samples $T_0$ corresponding to a pitch period of a frame including a signal $X_n$, the pitch gain $\sigma_0$ of the frame, and a value $B_0\gamma_0$ that becomes smaller as the consonant-likeness of the frame becomes higher and that becomes smaller as the flatness of the spectral envelope of the frame becomes higher, and the signal $X_n$ at the time n is obtained as an output signal $X^{new}$ (which corresponds to Example 3-1).

Effects

This configuration makes it possible to obtain the effects similar to those of the first embodiment. Furthermore, in the present embodiment, by also considering the second index value (the spectral envelope flatness index value) in addition to the first index value, it is possible to obtain a more appropriate consonant-likeness index value.

Other Modifications

Figure 3:
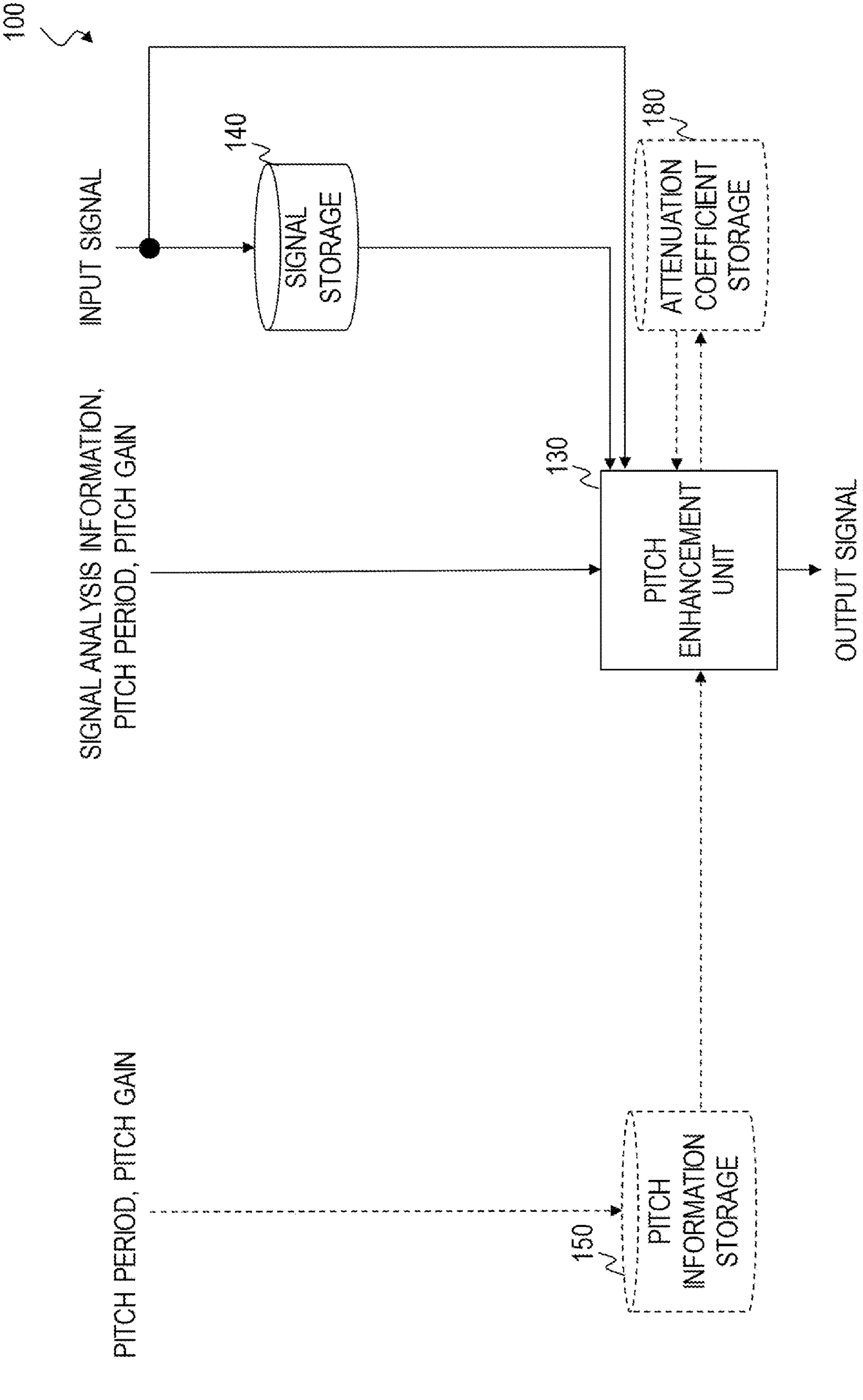
FIG. 3 is a functional block diagram of a pitch enhancement apparatus according to another modification.
Figure 4:
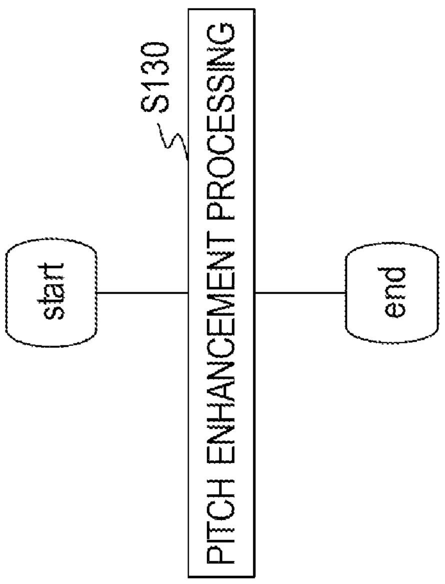
FIG. 4 is a diagram showing an example of a processing flow of the pitch enhancement apparatus according to the other modification.

When a pitch period, pitch gain, and signal analysis information of each frame are already obtained by, for example, decoding processing which is performed outside the speech pitch enhancement apparatus 100, the speech pitch enhancement apparatus 100 may be configured as shown in FIG. 3 so as to enhance a pitch based on the pitch period, the pitch gain, and the signal analysis information obtained outside the speech pitch enhancement apparatus 100. FIG. 4 shows a processing flow of the speech pitch enhancement apparatus 100. In this case, the speech pitch enhancement apparatus 100 does not have to include the autocorrelation function calculation unit 110, the pitch analysis unit 120, the signal feature analysis unit 170, and the autocorrelation function storage 160 which are included in the speech pitch enhancement apparatus 100 of the first embodiment, the second embodiment, the third embodiment, and the modifications thereof, and the pitch enhancement unit 130 only has to perform the pitch enhancement processing (S130) using the pitch period, the pitch gain, and the signal analysis information which were input to the speech pitch enhancement apparatus 100, not the pitch period and the pitch gain which were output from the pitch analysis unit 120 and the signal analysis information output from the signal feature analysis unit 170. With this configuration, it is possible to make the amount of arithmetic processing of the speech pitch enhancement apparatus 100 itself smaller than the amount of arithmetic processing in the first embodiment, the second embodiment, the third embodiment, and the modifications thereof. However, the speech pitch enhancement apparatus 100 of the first embodiment, the second embodiment, the third embodiment, and the modifications thereof can obtain a pitch period, pitch gain, and signal analysis information independently of the frequency of obtaining a pitch period, pitch gain, and signal analysis information outside the speech pitch enhancement apparatus 100, which allows the speech pitch enhancement apparatus 100 of the first embodiment, the second embodiment, the third embodiment, and the modifications thereof to perform pitch enhancement processing in frames, each having a very short length of time. In the above-described case of a sampling frequency of 32 kHz, if N is assumed to be 32, for instance, the speech pitch enhancement apparatus 100 of the first embodiment, the second embodiment, the third embodiment, and the modifications thereof can perform pitch enhancement processing in 1-ms frames.

The above description is based on the assumption that pitch enhancement processing is performed on an audio signal itself; alternatively, the present invention may be applied as pitch enhancement processing which is performed on linear prediction residual in a configuration, which is described in Non-patent Literature 1, for example, in which linear prediction synthesis is performed after pitch enhancement processing is performed on linear prediction residual. That is, the present invention may be applied, not to an audio signal itself, but to a signal derived from an audio signal, such as a signal obtained by performing an analysis or processing on an audio signal.

The present invention is not limited to the above embodiments and modifications. For example, the above-described various kinds of processing may be executed, in addition to being executed in chronological order in accordance with the descriptions, in parallel or individually depending on the processing power of an apparatus that executes the processing or when necessary. In addition, changes may be made as appropriate without departing from the spirit of the present invention.

<Program and Recording Medium>

Further, various types of processing functions in the apparatuses described in the above embodiments and modifications may be implemented on a computer. In that case, the processing details of the functions to be contained in each apparatus are written by a program. With this program executed on the computer, various types of processing functions in the above-described apparatuses are implemented on the computer.

This program in which the processing details are written can be recorded in a computer-readable recording medium. The computer-readable recording medium may be any medium such as a magnetic recording apparatus, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be distributed by storing the program in a storage of a server computer and transferring the program from the server computer to other computers via a network.

A computer which executes such program first stores the program recorded in a portable recording medium or transferred from a server computer once in a storage thereof, for example. When the processing is performed, the computer reads out the program stored in the storage thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that the program includes information which is provided for processing performed by electronic calculation equipment and which is equivalent to a program (such as data which is not a direct instruction to the computer but has a property specifying the processing performed by the computer).

Moreover, the apparatuses are assumed to be configured with a predetermined program executed on a computer. However, at least part of these processing details may be realized in a hardware manner.

What is claimed is:

1. A pitch enhancement apparatus that obtains an output signal by performing, for each time segment, pitch enhancement processing on an input signal derived from an audio signal, the pitch enhancement apparatus comprising:

processing circuitry configured to:

perform, as signal feature analysis processing with the input signal in the time segment as input and signal analysis information $I_0$ which indicates whether or not the time segment is a consonant as output, for each time segment, processing to judge whether or not the time segment is a consonant using the input signal in the time segment, perform, as the pitch enhancement processing with a pitch period of the time segment, a pitch gain $\sigma_0$ of the time segment, the signal analysis information $I_0$ of the time segment and the input signal in the time segment as input and an output signal as output, for a time segment judged to be a time segment where the signal analysis information $I_0$ of the time segment indicates that the time segment is a consonant, for each first time n of the time segment, processing to obtain, as the output signal, a fourth signal by performing operations including an addition by adding a third signal $B_0\sigma_0\gamma_0X_{n-T\_0}$ that is obtained by multiplying a second signal $X_{n-T\_0}$ at a second time $n-T_0$ by the pitch gain $\sigma_0$ of the time segment, a predetermined constant $B_0$ which is a value less than 1 and a value $\gamma_0$ that is greater than 0 and less than 1, the second time $n-T_0$ being an earlier time than the first time n by a number of samples $T_0$ corresponding to the pitch period of the time segment, and a first signal $X_n$ at the first time n, n being an integer, and for a time segment judged to be a time segment where the signal analysis information $I_0$ of the time segment indicates that the time segment is not a consonant, for each first time n of the time segment, processing to obtain, as the output signal, a sixth signal by performing operations including an addition by adding a fifth signal $B_0\sigma_0\gamma_0X_{n-T\_0}$ that is obtained by multiplying a second signal $X_{n-T\_0}$ at a second time $n-T_0$ by the pitch gain $\sigma_0$ of the time segment, and a predetermined constant $B_0$ which is a value less than 1, the second time $n-T_0$ being an earlier time than the first time n by a number of samples $T_0$ corresponding to the pitch period of the time segment, and a first signal $X_n$ at the first time n, n being an integer.

2. A pitch enhancement apparatus that obtains an output signal by performing, for each time segment, pitch enhancement processing on an input signal derived from an audio signal, the pitch enhancement apparatus comprising:

processing circuitry configured to:

perform, as signal feature analysis processing with the input signal in the time segment as input and signal analysis information $I_0$ as output, for each time segment, processing to obtain a consonant-likeness index value of time segment as the signal analysis information $I_0$ using the input signal in the time segment, perform, as the pitch enhancement processing with a pitch period of the time segment, a pitch gain $\sigma_0$ of the time segment, the signal analysis information $I_0$ of the time segment and the input signal in the time segment as input and an output signal as output, for each first time n of each time segment, processing to obtain, as the output signal, a fourth signal by performing operations including an addition by adding a third signal $B_0\sigma_0\gamma_0X_{n-T\_0}$ that is by multiplying a second signal $X_{n-T\_0}$ at a second time $n-T_0$ by the pitch gain $\sigma_0$ of the time segment and a value $B_0\gamma_0$ that becomes smaller as the signal analysis information $I_0$ becomes larger, the second time $n-T_0$ being an earlier time than the first time n by a number samples $T_0$ corresponding to the pitch period of the time segment, and a first signal $X_n$ at the first time n, n being an integer.

3. A pitch enhancement apparatus that obtains an output signal by performing, for each time segment, pitch enhancement processing on an input signal derived from an audio signal, the pitch enhancement apparatus comprising:

processing circuitry configured to:

perform, as signal feature analysis processing with the input signal in the time segment as input and signal analysis information $I_0$ which indicates whether or not the time segment is a consonant and whether or not the spectral envelope of the time segment is flat as output, for each time segment, processing to judge whether or not the time segment is a consonant and processing to judge whether or not a spectral envelope of the time segment is flat using the input signal in the time segment, perform, as the pitch enhancement processing with a pitch period of the time segment, a pitch gain $\sigma_0$ of the time segment, the signal analysis information $I_0$ of the time segment and the input signal in the time segment as input and an output signal as output, for a time segment judged to be a time segment where the signal analysis information $I_0$ of the time segment indicates that the time segment is a consonant or that the spectral envelope of the time segment is flat, for each first time n of the time segment, processing to obtain, as the output signal, a fourth signal by performing operations including an addition by adding a third signal $B_0\sigma_0\gamma_0 X_{n-T\_0}$ that is obtained by multiplying a second signal $X_{n-T\_0}$ at a second time $n-T_0$ by the pitch gain $\sigma_0$ of the time segment, a predetermined constant $B_0$ which is a value less than 1 and a value $\gamma_0$ that is greater than 0 and less than 1, the second time $n-T_0$ being an earlier time than the first time n by a number of samples $T_0$ corresponding to the pitch period of the time segment, and a first signal $X_n$ at the time n, n being an integer, and for a time segment judged to be a time segment where the signal analysis information $I_0$ of the time segment indicates that the time segment is not a consonant and that the spectral envelope of the time segment is not flat, for each first time n of the time segment, processing to obtain, as the output signal, a sixth signal by performing operations including an addition by adding a fifth signal $B_0\sigma_0\gamma_0 X_{n-T\_0}$ that is obtained by multiplying a second signal $X_{n-T\_0}$ at a second time $n-T_0$ by the pitch gain $\sigma_0$ of the time segment, and a predetermined constant $B_0$ which is a value less than 1, the second time $n-T_0$ being an earlier time than the first time n by a number of samples $T_0$ corresponding to the pitch period of the time segment, and a first signal $X_n$ at the first time n, n being an integer.

4. A pitch enhancement apparatus that obtains an output signal by performing, for each time segment, pitch enhancement processing on an input signal derived from an audio signal, the pitch enhancement apparatus comprising:

processing circuitry configured to:

perform, as signal feature analysis processing with the input signal in the time segment as input and signal analysis information $I_0$ as output, for each time segment, processing to obtain a consonant-likeness index value of time segment using the input signal in the time segment, processing to obtain a spectral envelope flatness index value of time segment using the input signal in the time segment, and processing to obtain the signal analysis information $I_0$ in the time segment which becomes larger as the consonant-likeness index value of time segment becomes larger and that becomes larger as the spectral envelope flatness index value of time segment becomes larger, perform, as the pitch enhancement processing with a pitch period of the time segment, a pitch gain $\sigma_0$ of the time segment, the signal analysis information $I_0$ of the time segment and the input signal in the time segment as input and an output signal as output, for each first time n of each time segment, processing to obtain, as the output signal, a fourth signal by performing operations including an addition by adding a third signal $B_0\sigma_0\gamma_0 X_{n-T\_0}$ that is obtained by multiplying a second signal $X_{n-T\_0}$ at a second time $n-T_0$ by the pitch gain $\sigma_0$ of the time segment and a value $B_0\gamma_0$ that becomes smaller as the signal analysis information $I_0$ becomes larger, the second time $n-T_0$ being an earlier time than the first time n by a number of samples $T_0$ corresponding to the pitch period of the time segment, and a first signal $X_n$ at the first time n, n being an integer.

5. A pitch enhancement method for obtaining an output signal by performing, for each time segment, pitch enhancement processing on an input signal derived from an audio signal, the pitch enhancement method, implemented by a pitch enhancement apparatus that includes processing circuitry, comprising:

a signal feature analysis step in which the processing circuitry performs, as signal feature analysis processing with the input signal in the time segment as input and signal analysis information $I_0$ which indicates whether or not the time segment is a consonant as output, for each time segment, processing to judge whether or not the time segment is a consonant using the input signal in the time segment, a pitch enhancement step in which the processing circuitry performs, as the pitch enhancement processing with a pitch period of the time segment, a pitch gain $\sigma_0$ of the time segment, the signal analysis information $I_0$ of the time segment and the input signal in the time segment as input and an output signal as output, for a time segment judged to be a time segment where the signal analysis information $I_0$ of the time segment indicates that the time segment is a consonant, for each first time n of the time segment, processing to obtain, as the output signal, a fourth signal by performing operations including an addition by adding a third signal $B_0\sigma_0\gamma_0 X_{n-T\_0}$ that is obtained by multiplying a second signal $X_{n-T\_0}$ at a second time $n-T_0$ by the pitch gain $\sigma_0$ of the time segment, a predetermined constant $B_0$ which is a value less than 1 and a value $\gamma_0$ that is greater than 0 and less than 1, the second time $n-T_0$ being an earlier time than the first time n by a number of samples $T_0$ corresponding to the pitch period of the time segment, and a first signal $X_n$ at the first time n, n being an integer, and for a time segment judged to be a time segment where the signal analysis information $I_0$ of the time segment indicates that the time segment is not a consonant, for each first time n of the time segment, processing to obtain, as the output signal, a sixth signal by performing operations including an addition by adding a fifth signal $B_0\sigma_0\gamma_0 X_{n-T\_0}$ that is obtained by multiplying a second signal $X_{n-T\_0}$ at a second time $n-T_0$ by the pitch gain $\sigma_0$ of the time segment and a predetermined constant $B_0$ which is a value less than 1, the second time $n-T_0$ being an earlier time than the first time n by a number of samples $T_0$ corresponding to the pitch period of the time segment, and a first signal $X_n$ at the time n, n being an integer.

6. A pitch enhancement method for obtaining an output signal by performing, for each time segment, pitch enhancement processing on an input signal derived from an audio signal, the pitch enhancement method, implemented by a pitch enhancement apparatus that includes processing circuitry, comprising:

a signal feature analysis step in which the processing circuitry performs, as signal feature analysis processing with the input signal in the time segment as input and signal analysis information $I_0$ as output, for each time segment, processing to obtain a consonant-likeness index value of time segment as the signal analysis information $I_0$ using the input signal in the time segment, a pitch enhancement step in which the processing circuitry performs, as the pitch enhancement processing with a pitch period of the time segment, a pitch gain $\sigma_0$ of the time segment, the signal analysis information $I_0$ of the time segment and the input signal in the time segment as input and an output signal as output, for each first time n of each time segment, processing to obtain, as the output signal, a fourth signal by performing operations including an addition by adding a third signal $B_0\sigma_0\gamma_0X_{n-T\_0}$ that is obtained by multiplying a second signal $X_{n-T\_0}$ at a second time $n-T_0$ by the pitch gain $\sigma_0$ of the time segment and a value $B_0\gamma_0$ that becomes smaller as the signal analysis information $I_0$ becomes larger, the second time $n-T_0$ being an earlier time than the first time n by a number of samples $T_0$ corresponding to the pitch period of the time segment, and a first signal $X_n$ at the first time n, n being an integer.

7. A pitch enhancement method for obtaining an output signal by performing, for each time segment, pitch enhancement processing on an input signal derived from an audio signal, the pitch enhancement method, implemented by a pitch enhancement apparatus that includes processing circuitry, comprising:

a signal feature analysis step in which the processing circuitry performs, as signal feature analysis processing with the input signal in the time segment as input and signal analysis information $I_0$ which indicates whether or not the time segment is a consonant and whether or not the spectral envelope of the time segment is flat as output, for each time segment, processing to judge whether or not the time segment is a consonant and processing to judge whether or not a spectral envelope of the time segment is flat using the input signal in the time segment, a pitch enhancement step in which the processing circuitry performs, as the pitch enhancement processing with a pitch period of the time segment, a pitch gain $\sigma_0$ of the time segment, the signal analysis information $I_0$ of the time segment and the input signal in the time segment as input and an output signal as output, for a time segment judged to be a time segment where the signal analysis information $I_0$ of the time segment indicates that the time segment is a consonant or that the spectral envelope of the time segment is flat, for each first time n of the time segment, processing to obtain, as the output signal, a fourth signal by performing operations including an addition by adding a third signal $B_0\sigma_0\gamma_0X_{n-T\_0}$ that is obtained by multiplying a second signal $X_{n-T\_0}$ at a second time $n-T_0$ by the pitch gain $\sigma_0$ of the time segment, a predetermined constant $B_0$ which is a value less than 1 and a value $\gamma_0$ that is greater than 0 and less than 1, the second time $n-T_0$ being an earlier time than the first time n by a number of samples $T_0$ corresponding to the pitch period of the time segment, and a first signal $X_n$ at the first time n, n being an integer, and for a time segment judged to be a time segment where the signal analysis information $I_0$ of the time segment indicates that the time segment is not a consonant and that the spectral envelope of the time segment is not flat, for each first time n of the time segment, processing to obtain, as the output signal, a sixth signal by performing operations including an addition by adding a fifth signal $B_0\sigma_0\gamma_0T_{n-T\_0}$ that is obtained by multiplying a second signal $X_{n-T\_0}$ at a second time $n-T_0$ by the pitch gain $\sigma_0$ of the time segment and a predetermined constant $B_0$ which is a value less than 1, the second time $n-T_0$ being an earlier time than the first time n by a number of samples $T_0$ corresponding to the pitch period of the time segment, and a first signal $X_n$ at the first time n, n being an integer.

8. A pitch enhancement method for obtaining an output signal by performing, for each time segment, pitch enhancement processing on an input signal derived from an audio signal, the pitch enhancement method, implemented by a pitch enhancement apparatus that includes processing circuitry, comprising:

a signal feature analysis step in which the processing circuitry performs, as signal feature analysis processing with the input signal in the time segment as input and signal analysis information $I_0$ as output, for each time segment, processing to obtain a consonant-likeness index value of time segment using the input signal in the time segment, processing to obtain a spectral envelope flatness index value of time segment using the input signal in the time segment, and processing to obtain the signal analysis information $I_0$ in the time segment which becomes larger as the consonant-likeness index value of time segment becomes larger and that becomes larger as the spectral envelope flatness index value of time segment becomes larger, a pitch enhancement step in which the processing circuitry performs, as the pitch enhancement processing with a pitch period of the time segment, a pitch gain $\sigma_0$ of the time segment, the signal analysis information $I_0$ of the time segment and the input signal in the time segment as input and an output signal as output, for each first time n of each time segment, processing to obtain, as the output signal, a fourth signal by performing operations including an addition by adding a third signal $B_0\sigma_0\gamma_0X_{n-T\_0}$ that is obtained by multiplying a second signal $X_{n-T\_0}$ at a second time $n-T_0$ by the pitch gain $\sigma_0$ of the time segment and a value $B_0\gamma_0$ that becomes smaller as the signal analysis information $I_0$ becomes larger, the second time $n-T_0$ being an earlier time than the first time n by a number of samples $T_0$ corresponding to the pitch period of the time segment, and a first signal $X_n$ at the first time n, n being an integer.

9. A pitch enhancement method for obtaining an output signal by performing, for each time segment, pitch enhancement processing on an input signal derived from an audio signal, the pitch enhancement method, implemented by a pitch enhancement apparatus that includes processing circuitry, comprising:

a signal feature analysis step in which the processing circuitry performs, as signal feature analysis processing with the input signal in the time segment as input and signal analysis information $I_0$ which indicates whether or not the time segment is a consonant and whether or not the spectral envelope of the time segment is flat as output, for each time segment, processing to judge whether or not the time segment is a consonant and processing to judge whether or not a spectral envelope of the time segment is flat using the input signal in the time segment, a pitch enhancement step in which the processing circuitry performs, as the pitch enhancement processing with a pitch period of the time segment, a pitch gain $\sigma_0$ of the time segment, the signal analysis information $I_0$ of the time segment and the input signal in the time segment as input and an output signal as output, for a time segment judged to be a time segment where the signal analysis information $I_0$ of the time segment indicates that the time segment is a consonant and that the spectral envelope of the time segment is flat, for each first time n of the time segment, processing to obtain, as the output signal, a fourth signal by performing operations including an addition by adding a third signal $B_0\sigma_0\gamma_0X_{n-T\_0}$ that is obtained by multiplying a second signal $X_{n-T\_0}$ at a second time $n-T_0$ by the pitch gain $\sigma_0$ of the time segment, a predetermined constant $B_0$ which is a value less than 1 and a value $\gamma_0$ that is greater than 0 and less than 1, the second time $n-T_0$ being an earlier time than the first time n by a number of samples $T_0$ corresponding to the pitch period of the time segment, and a first signal X at the first time n, and for a time segment judged to be a time segment where the signal analysis information $I_0$ of the time segment indicates that the time segment is not a consonant or that the spectral envelope of the time segment is not flat, for each first time n of the time segment, processing to obtain, as the output signal, a sixth signal by performing operations including an addition by adding a fifth signal $B_0\sigma_0\gamma_0X_{n-T\_0}$ that is obtained by multiplying a second signal $X_{n-T\_0}$ at a second time $n-T_0$ by the pitch gain $\sigma_0$ of the time segment, and a predetermined constant $B_0$ which is a value less than 1, the second time $n-T_0$ being an earlier time than the first time n by a number of samples $T_0$ corresponding to the pitch period of the time segment, and a first signal $X_n$ at the first time n, n being an integer.

10. A non-transitory computer-readable recording medium on which a program for making a computer execute the pitch enhancement method according to any one of claims 5 to 8, and 9 is recorded.

11. A pitch enhancement apparatus that obtains an output signal by performing, for each time segment, pitch enhancement processing on an input signal derived from an audio signal, the pitch enhancement apparatus comprising:

processing circuitry configured to:

perform, as signal feature analysis processing with the input signal in the time segment as input and signal analysis information $I_0$ which indicates whether or not the time segment is a consonant and whether or not the spectral envelope of the time segment is flat as output, for each time segment, processing to judge whether or not the time segment is a consonant and processing to judge whether or not a spectral envelope of the time segment is flat using the input signal in the time segment, perform, as the pitch enhancement processing with a pitch period of the time segment, a pitch gain $\sigma_0$ of the time segment, the signal analysis information $I_0$ of the time segment and the input signal in the time segment as input and an output signal as output, for a time segment judged to be a time segment where the signal analysis information $I_0$ of the time segment indicates that the time segment is a consonant and that the spectral envelope of the time segment is flat, for each first time n of the time segment, processing to obtain, as the output signal, a fourth signal by performing operations including an addition by adding a third signal $B_0\sigma_0\gamma_0X_{n-T\_0}$ that is obtained by multiplying a second signal $X_{n-T\_0}$ at a second time $n-T_0$ by the pitch gain $\sigma_0$ of the time segment, a predetermined constant $B_0$ which is a value less than 1 and a value $\gamma_0$ that is greater than 0 and less than 1, the second time $n-T_0$ being an earlier time than the first time n by a number of samples $T_0$ corresponding to a pitch period of the time segment, and a first signal X at the first time n, and for a time segment judged to be a time segment where the signal analysis information $I_0$ of the time segment indicates that the time segment is not a consonant or that the spectral envelope of the time segment is not flat, for each first time n of the time segment, processing to obtain, as the output signal, a sixth signal by performing operations including an addition by adding a fifth signal $B_0\sigma_0\gamma_0X_{n-T\_0}$ that is obtained by multiplying a second signal $X_{n-T\_0}$ at a second time $n-T_0$ by the pitch gain $\sigma_0$ of the time segment, and a predetermined constant $B_0$ which is a value less than 1, the second time $n-T_0$ being an earlier time than the first time n by a number of samples $T_0$ corresponding to the pitch period of the time segment, and a first signal $X_n$ at first the time n, n being an integer.

* * * * *